US011758252B2

(12) United States Patent
Kawase et al.

(10) Patent No.: US 11,758,252 B2
(45) Date of Patent: Sep. 12, 2023

(54) IMAGE PICKUP MODULE, IMAGE PICKUP APPARATUS, AND ELECTRONIC DEVICE

(71) Applicant: CANON KABUSHIKI KAISHA, Tokyo (JP)

(72) Inventors: Yoshitaka Kawase, Kanagawa (JP); Yasuhiko Sano, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 20 days.

(21) Appl. No.: 17/496,875

(22) Filed: Oct. 8, 2021

(65) Prior Publication Data

US 2022/0116526 A1  Apr. 14, 2022

(30) Foreign Application Priority Data

Oct. 14, 2020  (JP) ................. 2020-173533

(51) Int. Cl.
*H04N 23/52* (2023.01)
*G03B 17/14* (2021.01)
*H04N 23/51* (2023.01)
*H04N 23/55* (2023.01)
*H04N 25/79* (2023.01)

(52) U.S. Cl.
CPC ............. *H04N 23/52* (2023.01); *G03B 17/14* (2013.01); *H04N 23/51* (2023.01); *H04N 23/55* (2023.01); *H04N 25/79* (2023.01)

(58) Field of Classification Search
CPC ........ H04N 23/52; H04N 23/51; H04N 23/55; H04N 25/79; H04N 23/54; G03B 17/14; H01L 27/14636; H01L 25/0657

USPC .................................................. 348/207.99
See application file for complete search history.

(56) References Cited

U.S. PATENT DOCUMENTS 7,589,787 B2 * 9/2009 Shinomiya ........... H04N 25/709
348/374
7,692,300 B2 * 4/2010 Kikuchi ................ H05K 1/0231
438/106
11,013,105 B2  5/2021 Ye et al.
(Continued)

FOREIGN PATENT DOCUMENTS

JP  2007-250928 A  9/2007
JP  2017-055099 A  3/2017
JP  2017-103517 A  6/2017

*Primary Examiner* — Lin Ye
*Assistant Examiner* — Chan T Nguyen
(74) *Attorney, Agent, or Firm* — Venable LLP

(57) ABSTRACT

An image pickup module includes a first base body, a pixel portion, a first conductive pattern, a second base body, a second conductive pattern, and a conductor portion. The pixel portion is provided in the first base body and includes a plurality of pixels arranged in a first direction and a second direction. The first conductive pattern is provided in the first base body. The first base body is provided on the second base body. The second conductive pattern is provided in the second base body and electrically connected to the first conductive pattern via a first connection conductor portion and a second connection conductor portion. A loop structure including the first conductive pattern, the second conductive pattern, the first connection conductor portion, and the second connection conductor portion is formed as viewed in the first direction. The conductor portion is connected in parallel to the first conductive pattern.

16 Claims, 20 Drawing Sheets

(56) References Cited

U.S. PATENT DOCUMENTS

| | | | |
|---|---|---|---|
| 2015/0109504 A1* | 4/2015 | Sakuragi | H01L 27/14634 |
| | | | 257/459 |
| 2016/0014356 A1 | 1/2016 | Sakuragi | |
| 2017/0078603 A1* | 3/2017 | Yamasaki | H04N 25/75 |
| 2020/0084877 A1 | 3/2020 | Ye et al. | |

* cited by examiner

IMAGE PICKUP MODULE, IMAGE PICKUP APPARATUS, AND ELECTRONIC DEVICE

BACKGROUND OF THE INVENTION

Field of the Invention

The present invention relates to an anti-noise technique for an image pickup module.

Description of the Related Art

An image pickup apparatus such as a digital video camera or a digital still camera includes an image pickup module including an image sensor. In recent years, the ISO sensitivity of image sensors have been improved. ISO stands for International Organization for Standardization. As a result of this, it has become possible to generate a clearer image even in the case of capturing an image in a scene with a small amount of light such as night scenery.

However, as the ISO sensitivity of image sensors have improved, the sensitivity to small magnetic field noises that has been conventionally not an issue has also increased. As a result, an issue that an image sensor is affected by a magnetic field noise and the image is disturbed has arisen.

Japanese Patent Laid-Open No. 2017-55099 discloses reducing the magnetic field noise by setting the electrical resistance value of peripheral ground wiring corresponding to a peripheral circuit present around pixels to be higher than the electrical resistance value of pixel ground wiring corresponding to the pixels.

However, in wiring used for applying a voltage to each pixel of an image sensor, when the electrical resistance value of the wiring increases, a voltage drop in the wiring increases, and there is a possibility that the voltage applied to each pixel becomes lower than a reference voltage. When the voltage applied to each pixel becomes lower than the reference voltage, there is a possibility that unevenness such as a smear or shading occurs in an image generated by the image sensor.

SUMMARY OF THE INVENTION

According to one aspect of the present invention, an image pickup module includes a first base body, a pixel portion, a first conductive pattern, a second base body, a second conductive pattern, and a conductor portion. The pixel portion is provided in the first base body and includes a plurality of pixels arranged in a first direction and a second direction perpendicular to the first direction. The first conductive pattern is provided in the first base body and is used for applying a voltage to each pixel of the pixel portion. The first base body is provided on the second base body. The second conductive pattern is provided in the second base body and electrically connected to the first conductive pattern via a first connection conductor portion and a second connection conductor portion. A loop structure of conductor including the first conductive pattern, the second conductive pattern, the first connection conductor portion, and the second connection conductor portion is formed as viewed in the first direction. The conductor portion is connected in parallel to the first conductive pattern.

Further features of the present invention will become apparent from the following description of exemplary embodiments with reference to the attached drawings.

DESCRIPTION OF THE EMBODIMENTS

Embodiments for implementing the present invention will be described in detail below with reference to drawings.

First Embodiment

Figure 1:
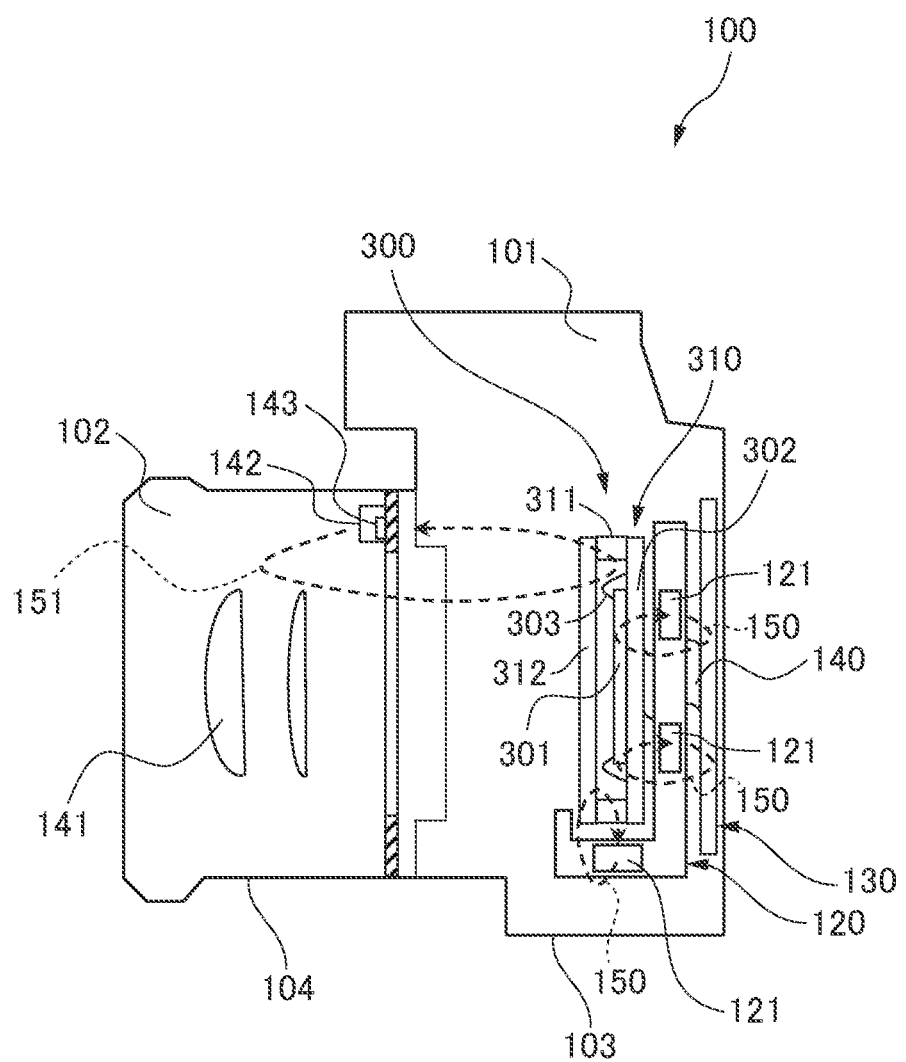
FIG. 1 is an explanatory diagram illustrating an image pickup apparatus serving as an example of an electronic device according to a first embodiment.

FIG. 1 is an explanatory diagram illustrating an image pickup apparatus 100 serving as an example of an electronic device according to a first embodiment. The image pickup apparatus 100 is a digital camera such as a digital still camera or a digital video camera, and is a digital single lens reflex camera in an example of FIG. 1. The image pickup apparatus 100 includes a body 101, and an interchangeable lens 102 that is a lens device attachable to and detachable from the body 101.

The body 101 includes a casing 103, an image pickup module 300, an image processing module 130, and a shake correction module 120. The image pickup module 300, the image processing module 130, and the shake correction module 120 are disposed inside the casing 103. An unillustrated battery is disposed inside the casing 103, and the battery supplies power to the modules 300, 130, and 120, and the interchangeable lens 102.

Figure 2:
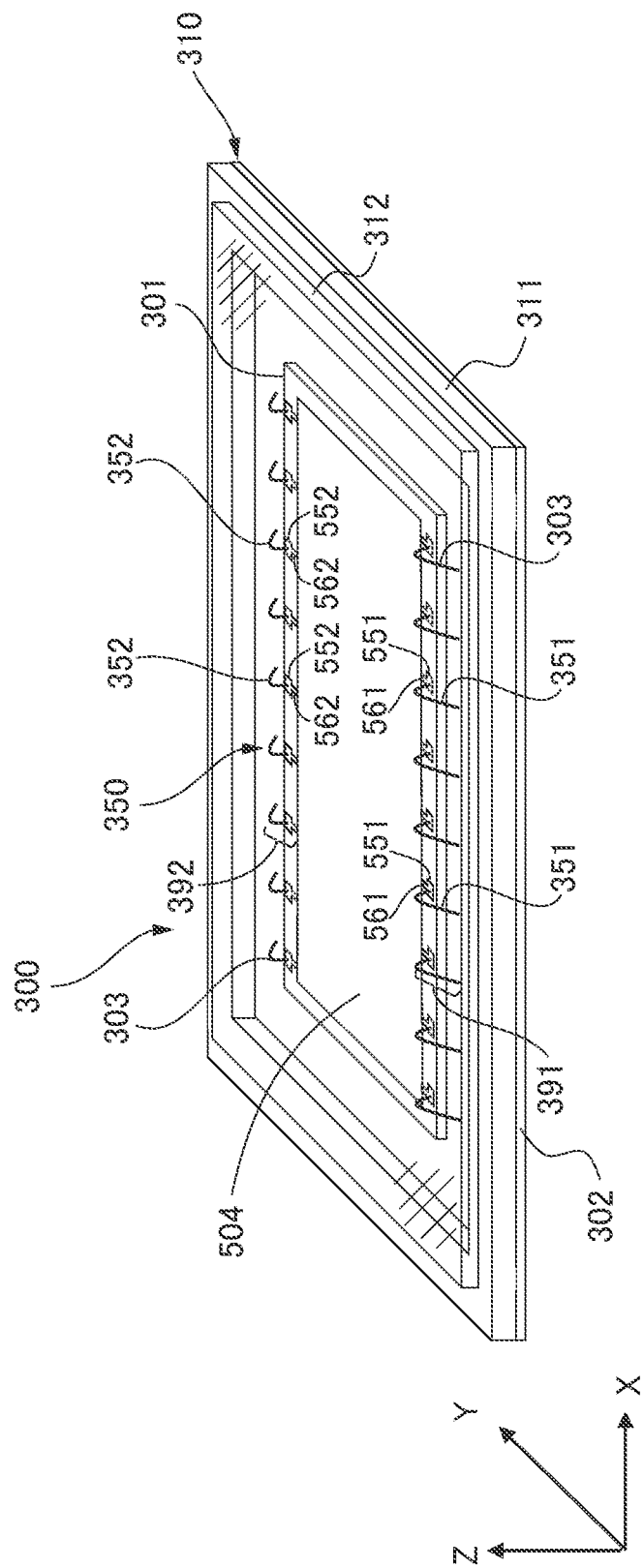
FIG. 2 is a perspective view of an image pickup module according to the first embodiment.

FIG. 2 is a perspective view of the image pickup module 300 according to the first embodiment. As illustrated in FIGS. 1 and 2, the image pickup module 300 includes a module body 310 capable of capturing an image of an object. The module body 310 includes an image sensor 301, and a printed wiring board 302 on which the image sensor 301 is mounted. The printed wiring board 302 includes wiring such as a power supply line, a ground line, and a signal line. In addition, the printed wiring board 302 is a rigid wiring board. In the present embodiment, the image sensor 301 and the printed wiring board 302 are connected to each other by wire bonding. That is, the module body 310 includes a plurality of wires 303 electrically interconnecting the image sensor 301 and the printed wiring board 302. The wires 303 are each formed from metal such as gold. These wires 303 are also referred to as bonding wires. The module body 310 includes aground line 350. To be noted, FIG. 2 illustrates wires 351 and 352 serving as a part of the ground line 350 among the plurality of wires 303.

Here, the longitudinal direction of the image pickup module 300 is set as an X-axis direction. The short-side direction of the image pickup module 300 is set as a Y-axis direction. A direction perpendicular to the sensor surface, that is, the light receiving surface of the image sensor 301 is set as a Z-axis direction. The X-axis direction, the Y-axis direction, and the Z-axis direction are perpendicular to each other. The X-axis direction serves as a first direction, the Y-axis direction serves as a second direction, and the Z-axis direction serves as a third direction. The wires 351 are disposed on the first end side of the image sensor 301 in the Y-axis direction. The wires 352 are disposed on the second end side of the image sensor 301 in the Y-axis direction.

In addition, the image pickup module 300 includes a frame member 311 provided on the printed wiring board 302 so as to surround the image sensor 301, and a cover glass 312 disposed on the light receiving surface side of the image sensor 301 and supported by the frame member 311. The cover glass 312 is a transparent member. The frame member 311 is formed from a material that is electrically insulating, for example, resin, and is fixed to the printed wiring board 302 with, for example, an adhesive. The cover glass 312 is fixed to the frame member 311 with, for example, an adhesive. The image sensor 301 on the printed wiring board 302 is sealed by the frame member 311 and the cover glass 312.

The image processing module 130 illustrated in FIG. 1 includes a printed wiring board and an image processing large-scale integrated circuit: image processing LSI and electronic circuit parts that are mounted on the printed wiring board. The image pickup module 300 and the image processing module 130 are electrically interconnected via a flexible substrate 140.

The shake correction module 120 includes a plurality of coils 121. The coils 121 are each a winding coil and an inductor. The coils 121 each generate a magnetic field 150 as a result of an alternating current flowing therethrough.

The interchangeable lens 102 includes a casing 104 attachable to and detachable from the casing 103, a lens 141 disposed inside the casing 104, and a motor 142 that is disposed inside the casing 104 and drives the lens 141. A driving circuit that drives the motor 142 includes a coil 143 that is an inductor. When an alternating current flows in the coil 143, the coil 143 generates a magnetic field 151. The magnetic field 150 generated by each of the coils 121 and the magnetic field 151 generated by the coil 143 constitute a magnetic field formed around the image pickup module 300.

The coils 121 and 143 operate when an alternating current of a frequency of a kHz band is supplied thereto. The coils 121 and 143 generate the magnetic fields 150 and 151 therearound when the alternating current is supplied thereto. The magnetic fields 150 and 151 can serve as a magnetic field noise for the image sensor 301. To be noted, although the magnetic fields 150 and 151 are indicated by arrows of broken lines in FIG. 1, since the magnetic fields are alternating magnetic fields generated by alternating currents, the directions thereof are alternately switched between the directions of the broken line arrows and the opposite directions thereof.

The image sensor 301 is, for example, a complementary metal oxide semiconductor image sensor: CMOS image sensor, or a charge-coupled device image sensor: CCD image sensor. The image sensor 301 is preferably a CMOS image sensor, and a case where the image sensor 301 is a CMOS image sensor will be described below.

Figure 3:
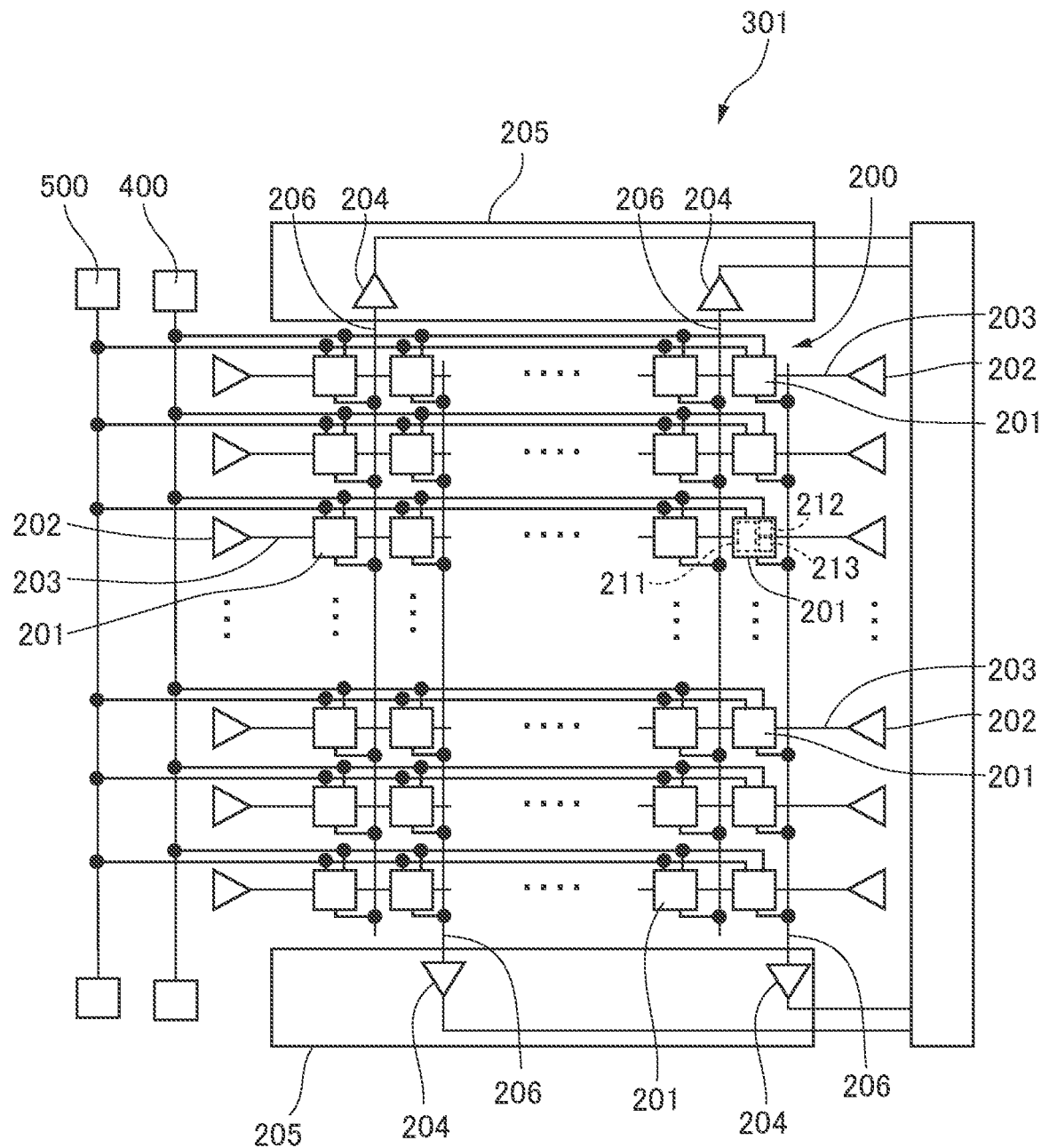
FIG. 3 is a circuit diagram illustrating a configuration of an image sensor according to the first embodiment.

FIG. 3 is a circuit diagram illustrating a configuration of the image sensor 301 according to the first embodiment. The image sensor 301 includes a plurality of pixels 201. The pixels 201 each include a photodiode 211 serving as an example of a light receiving portion that performs photoelectric conversion, a floating diffusion capacitor element: FD capacitor element 212 that accumulates electric charges, and a transistor 213 that controls charge transfer. The plurality of pixels 201 are arranged in a matrix shape in the X-axis direction and the Y-axis direction. A pixel portion 200 includes the plurality of pixels 201.

In addition, the image sensor 301 includes a plurality of drivers 202 and a plurality of peripheral circuit portions 205. The drivers 202 are each a driver for selecting a pixel from which charges are to be collected. The pixels 201 are each connected to a corresponding driver 202 via a row selection line 203. The peripheral circuit portion 205 includes a plurality of drivers 204. The drivers 204 are each a driver for reading and amplifying photoelectrically-converted charges. The pixels 201 are each connected to a corresponding driver 204 via a vertical signal line 206.

In the image sensor 301, one of the plurality of row selection lines 203 is selected, and charges in the pixels 201 connected to the selected row selection line 203 are transferred to the peripheral circuit portions 205. To apply a reference voltage that is a direct current voltage required for driving the pixels 201 to each of the pixels 201, the pixels 201 are each connected to a power wiring portion 400 that is a part of an unillustrated power supply line, and a ground wiring portion 500 that is apart of the ground line 350 illustrated in FIG. 2. The power wiring portion 400, the ground wiring portion 500, and an unillustrated signal wiring portion are connected to corresponding wiring of the printed wiring board 302 illustrated in FIG. 1 via the wires 303.

Figure 4A:
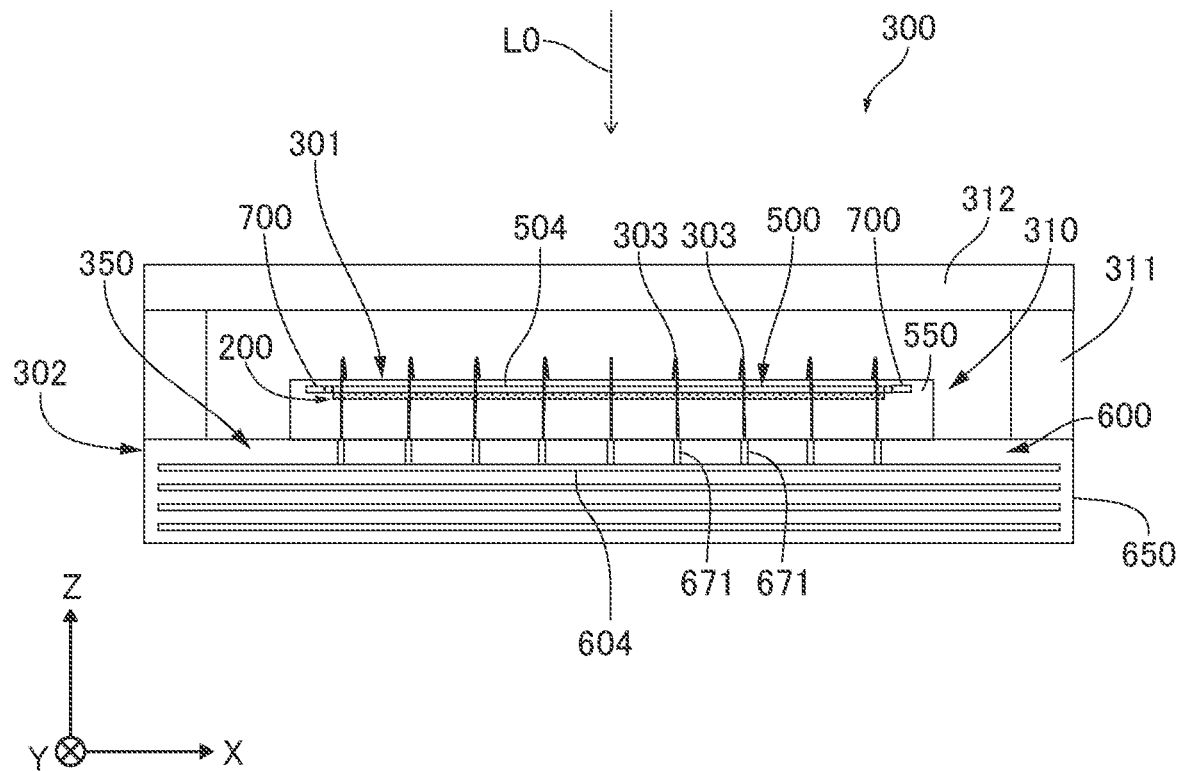
FIG. 4A is a section view of the image pickup module according to the first embodiment.
Figure 4B:
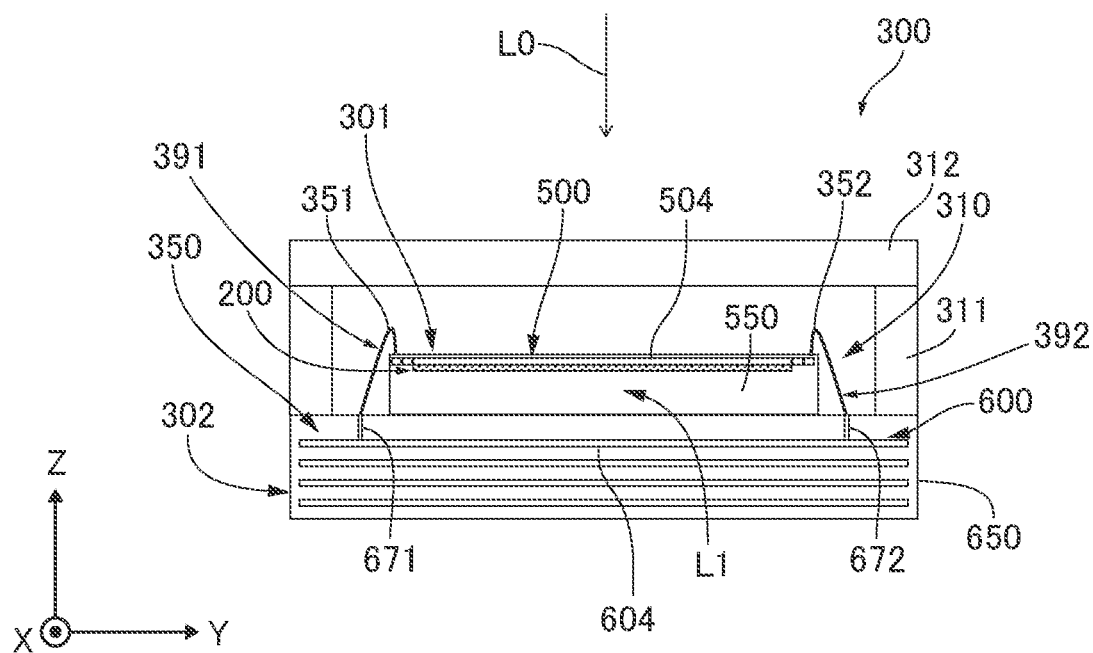
FIG. 4B is a section view of the image pickup module according to the first embodiment.

FIGS. 4A and 4B are each a section view of the image pickup module 300 according to the first embodiment. FIG.

Figure 5:
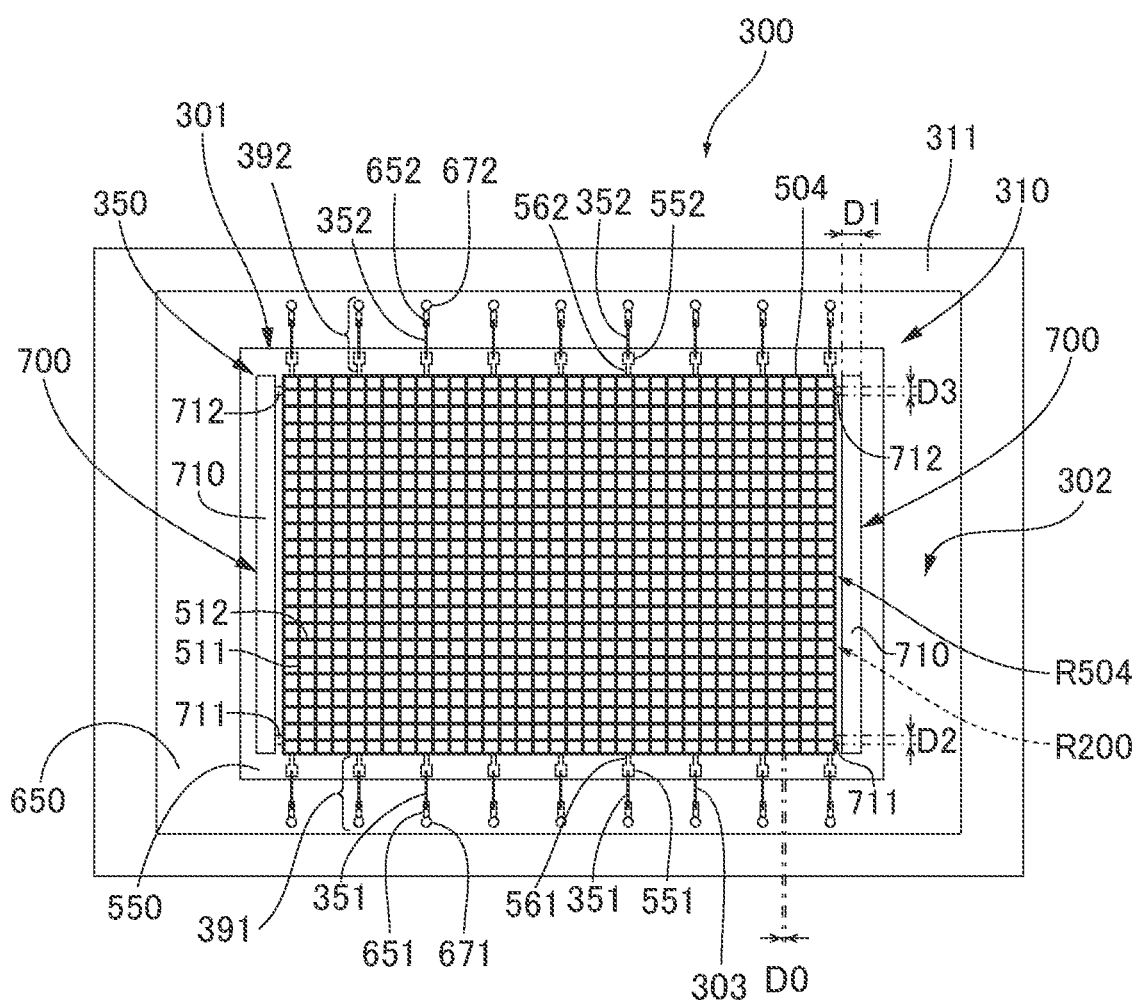
FIG. 5 is a plan view of the image pickup module according to the first embodiment.

5 is a plan view of the image pickup module 300 according to the first embodiment. FIG. 4A is a schematic section view of the image pickup module 300 taken along an X-Z plane. FIG. 4B is a schematic section view of the image pickup module 300 taken along a Y-Z plane. FIG. 5 is a schematic plan view of the image pickup module 300 as viewed in a direction perpendicular to an X-Y plane. To be noted, in FIG. 5, illustration of the cover glass 312 is omitted.

The module body 310 of the image pickup module 300 includes the ground line 350 connected to the negative electrode side of the battery serving as a direct current power source.

In the first embodiment, the image sensor 301 is an image sensor of a front side illumination type. The image sensor 301 includes a base body 550 serving as an example of a first base body, and the pixel portion 200 and the ground wiring portion 500 that have been described above. In the present embodiment, the base body 550 is a semiconductor substrate, for example, a silicon substrate. The pixel portion 200 and the ground wiring portion 500 are provided in the base body 550. The ground wiring portion 500 is included in the ground line 350. The ground wiring portion 500 is formed from metal such as copper, aluminum, or tungsten.

The ground wiring portion 500 is used for applying a voltage to each pixel 201 of the pixel portion 200 illustrated in FIG. 3. Specifically, the ground wiring portion 500 is used for applying a ground potential to each pixel 201 among a power source potential and the ground potential.

The ground wiring portion 500 includes a ground pattern 504 serving as an example of a first conductive pattern. The ground pattern 504 has a rectangular shape as viewed in the Z-axis direction. A region R504 surrounds the ground pattern 504 when the module body 310 is viewed in the Z-axis direction. In addition, a region R200 surrounds the pixel portion 200 when the module body 310 is viewed in the Z-axis direction. The region R504 overlaps with part or the entirety of the region R200 when the module body 310 is viewed in the Z-axis direction. In the present embodiment, the region R504 overlaps with the entirety of the region R200 when the module body 310 is viewed in the Z-axis direction. That is, the region R504 includes the region R200 when the module body 310 is viewed in the Z-axis direction.

In the present embodiment, the region R504 is a rectangular region of the minimum area among regions surrounding the ground pattern 504 when the module body 310 is viewed in the Z-axis direction. In other words, the region R504 is a region defined by the outer shape of the ground pattern 504 when the module body 310 is viewed in the Z-axis direction. In addition, in the present embodiment, the region R200 is a rectangular region of the minimum area among regions surrounding the pixel portion 200 when the module body 310 is viewed in the Z-axis direction. In other words, the region R200 is a region defined by the outer shape of the pixel portion 200 when the module body 310 is viewed in the Z-axis direction.

The ground pattern 504 is disposed on the light incident side of the pixel portion 200, that is, disposed on the side on which light L0 is incident on the photodiode 211 of each pixel 201 of the pixel portion 200 illustrated in FIG. 3. In addition, the ground pattern 504 is formed in a mesh shape such that the light L0 passes therethrough to the photodiode 211 of each pixel 201. As a result of this, the light L0 is incident on the photodiode 211 of each pixel 201 of the pixel portion 200 through the mesh shape of the ground pattern 504. In addition, since the ground pattern 504 has a mesh shape, warpage of the image sensor 301 caused by change in the temperature of the image pickup module 300 can be suppressed.

The printed wiring board 302 includes a base body 650 serving as an example of a second base body, and a ground wiring portion 600 provided in the base body 650. The base body 650 is, for example, an insulating substrate formed from an insulating material such as glass epoxy resin or ceramics. The ground wiring portion 600 is included in the ground line 350. The ground wiring portion 600 is formed from metal such as copper, aluminum, or tungsten.

The ground wiring portion 600 includes a ground pattern 604 serving as an example of a second conductive pattern. For example, the ground pattern 604 is disposed in an inner layer of the base body 650 of the printed wiring board 302.

The ground pattern 504 and the ground pattern 604 are electrically connected to each other by at least one first connection conductor portion and at least one second connection conductor portion. In the present embodiment, the at least one first connection conductor portion is a plurality of, for example, nine connection conductor portions 391 as illustrated in FIG. 5. In the present embodiment, the at least one second connection conductor portion is a plurality of, for example, nine connection conductor portions 392 as illustrated in FIG. 5. The connection conductor portions 391 and 392 are each included in the ground line 350. The plurality of connection conductor portions 391 are arranged on the first end side of the ground pattern 504 in the Y-axis direction at intervals in the X-axis direction. The plurality of connection conductor portions 392 are arranged on the second end side of the ground pattern 504 in the Y-axis direction at intervals in the X-axis direction.

As illustrated in FIG. 5, the connection conductor portions 391 each include a pad 551, a connection line 561, a wire 351, a pad 651, and a via conductor 671. The pad 551 and the connection line 561 are included in the image sensor 301. The pad 551 and the connection line 561 are disposed in the same layer as the ground pattern 504 in the base body 550. The pad 551 and the ground pattern 504 are interconnected by the connection line 561.

The pad 651 and the via conductor 671 are included in the printed wiring board 302. The pad 651 is disposed in an outer layer of the base body 650. The pad 651 disposed in the outer layer and the ground pattern 604 disposed in the inner layer are interconnected by the via conductor 671. The pad 551 and the pad 651 are interconnected by the wire 351.

As illustrated in FIG. 5, the connection conductor portions 392 each include a pad 552, a connection line 562, a wire 352, a pad 652, and a via conductor 672. The pad 552 and the connection line 562 are included in the image sensor 301. The pad 552 and the connection line 562 are disposed in the same layer as the ground pattern 504 in the base body 550. The pad 552 and the ground pattern 504 are interconnected by the connection line 562.

The pad 652 and the via conductor 672 are included in the printed wiring board 302. The pad 652 is disposed in an outer layer of the base body 650. The pad 652 disposed in the outer layer and the ground pattern 604 disposed in the inner layer are interconnected by the via conductor 672. The pad 552 and the pad 652 are interconnected by the wire 352.

As described above, the ground pattern 504 of the image sensor 301 and the ground pattern 604 of the printed wiring board 302 are electrically connected to each other via the connection conductor portions 391 and 392.

As illustrated in FIG. 4B, part of the ground line 350 forms a loop structure L1 formed from a conductor when the module body 310 is viewed from the side in the X-axis direction. The loop structure L1 includes the ground pattern 504, the ground pattern 604, the connection conductor portions 391, and the connection conductor portions 392. The magnetic fields 150 and 151 illustrated in FIG. 1 cross the loop structure L1. Therefore, an induced current is generated in the loop structure L1. This induced current generates a noise voltage in the pixels 201 of the pixel portion 200 illustrated in FIG. 3. This noise voltage will be also referred to as an induced noise voltage.

In the first embodiment, the ground line 350 of the module body 310 includes at least one conductor portion connected in parallel to the ground pattern 504 in addition to the ground pattern 604. The at least one conductor portion is two conductor portions 700 in the first embodiment.

Figure 6:
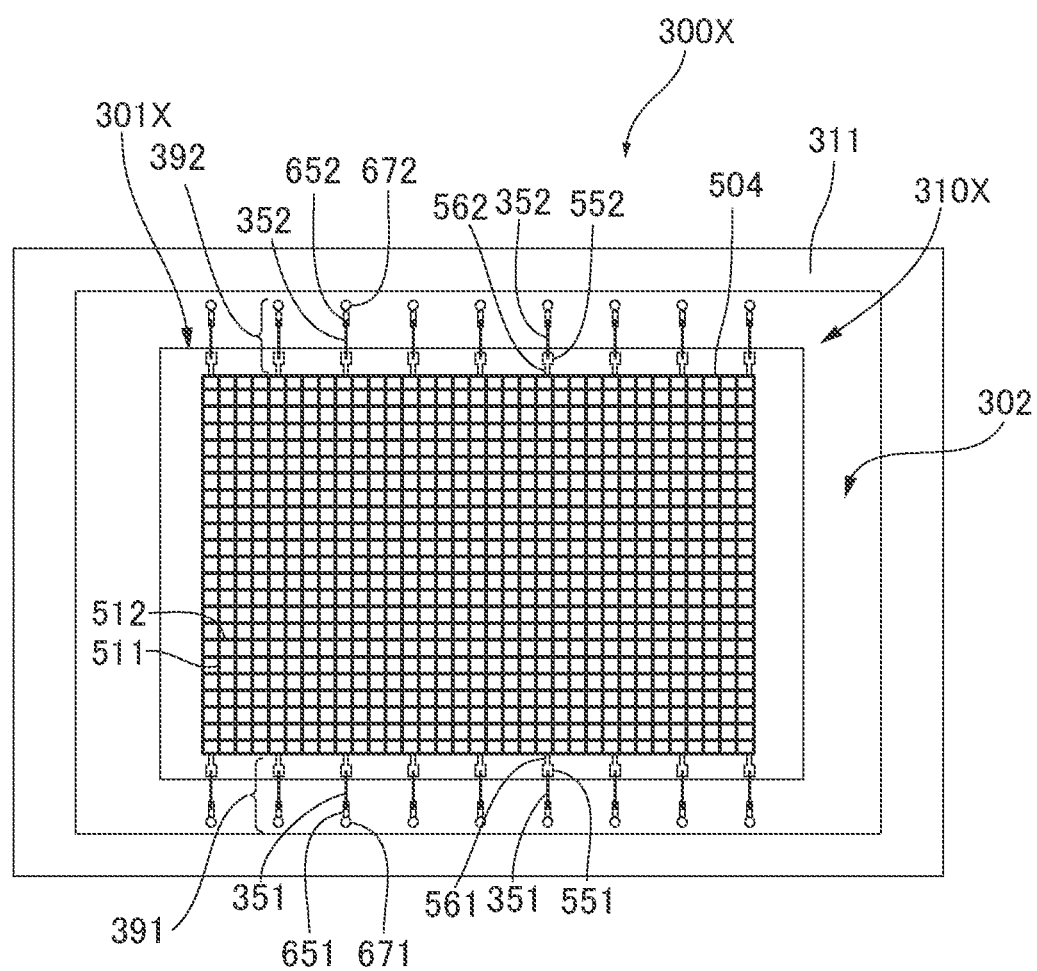
FIG. 6 is a plan view of an image pickup module of a comparative example.

Here, an image pickup module of a comparative example not including the conductor portions 700 will be described. FIG. 6 is a plan view of an image pickup module 300X of the comparative example. In FIG. 6, elements configured in substantially the same manner as in the first embodiment are denoted by the same reference signs. The image pickup module 300X of the comparative example has a configuration in which only the conductor portions 700 are omitted from the image pickup module 300 of the first embodiment. That is, the image pickup module 300X includes a module body 310X. The module body 310X includes an image sensor 301X and a printed wiring board 302. The image sensor 301X includes the ground pattern 504. The ground pattern 504 of the image sensor 301X and the ground pattern 604 of the printed wiring board 302 illustrated in FIGS. 4A and 4B are electrically connected to each other via the plurality of connection conductor portions 391 and the plurality of connection conductor portions 392.

Figure 7:
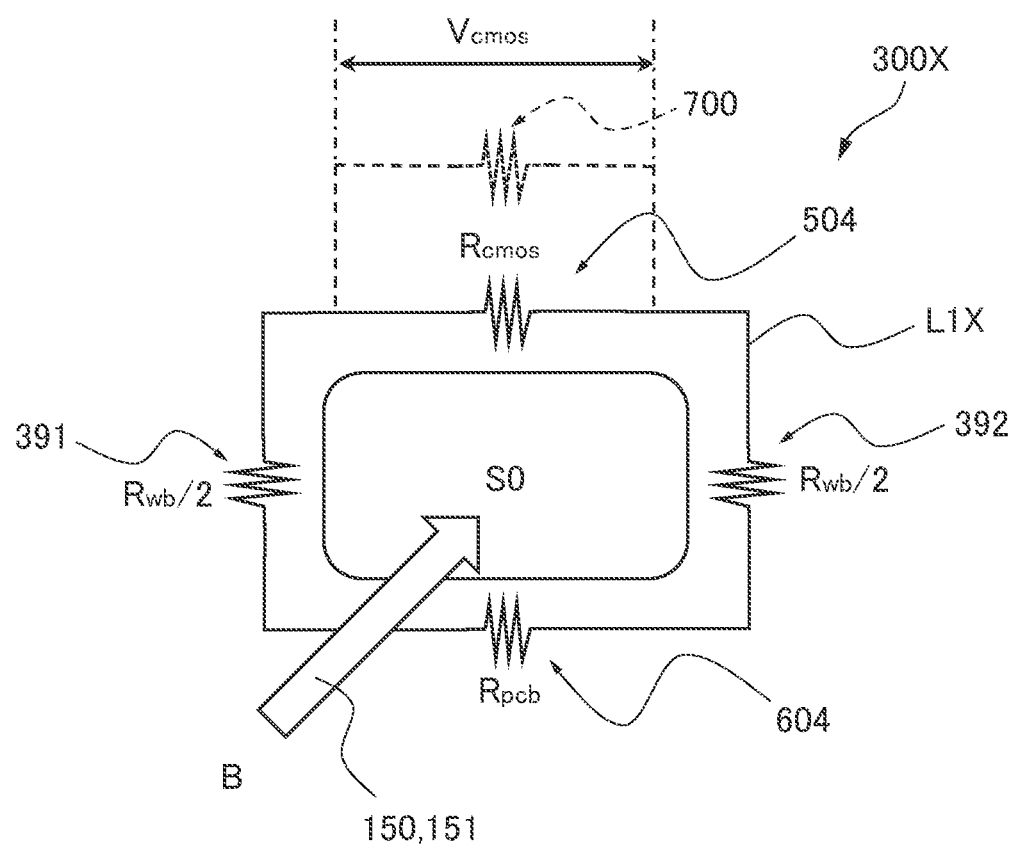
FIG. 7 is an equivalent circuit diagram of the image pickup module of the comparative example.

FIG. 7 is an equivalent circuit diagram of the image pickup module 300X of the comparative example. In the image pickup module 300X of the comparative example, a loop structure L1X including the ground pattern 504 of the image sensor 301X, the ground pattern 604 of the printed wiring board 302, the plurality of connection conductor portions 391, and the plurality of connection conductor portions 392 is formed. The noise voltage induced in the ground pattern 504 of the loop structure L1X is represented by $V_{cmos}$. The noise voltage $V_{cmos}$ is expressed by the following formula (1).

$$V_{cmos} = \alpha \times \frac{R_{cmos}}{(R_{pcb} + R_{wb} + R_{cmos})} \times \left( -\frac{d}{dt} \oint_{S0} B \cdot n ds \right) \quad (1)$$

To be noted, α represents a propagation coefficient in the sensor. $R_{cmos}$ represents the electrical resistance of the ground pattern 504. $R_{wb}$ represents the combined electrical resistance of the plurality of connection conductor portions 391 and the plurality of connection conductor portions 392. $R_{pcb}$ represents the electrical resistance of the ground pattern 604 in the printed wiring board 302. S0 represents the area of the region inside the loop structure L1X when the module body 310X is viewed from the side in the X-axis direction. dt represents infinitesimal time, ds represents infinitesimal area, bold B represents a magnetic field vector, and bold n represents a unit vector perpendicular to ds.

It is assumed that the frequency of the magnetic fields 150 and 151 crossing the loop structure L1X and the area S0 of the loop structure L1X are constant. In this case, the noise voltage $V_{cmos}$ is induced in accordance with a resistance ratio $R_{cmos}/(R_{pcb}+R_{wb}+R_{cmos})$ of the resistance value of the ground pattern 504 to the combined resistance value of the loop structure L1X.

Therefore, in the first embodiment, the conductor portions 700 indicated by a broken line in FIG. 7 are connected in parallel to the ground pattern 504. As a result of this, a parallel circuit of the ground pattern 504 and the conductor portions 700 is formed. The parallel circuit of the ground pattern 504 and the conductor portions 700 reduces the resistance ratio of the formula (1), and the reduction of the resistance ratio reduces the induced noise voltage $V_{cmos}$. As a result of this, superposition of a noise on a generated image can be reduced. Therefore, the quality of an image generated by the image sensor 301 can be improved.

In addition, voltage drop in the ground pattern 504 can be reduced, and the direct current voltage applied to the pixels 201 being lower than the reference voltage can be suppressed. As a result of this, occurrence of unevenness such as a smear or shading in the image generated by the image sensor 301 can be suppressed. Therefore, the quality of an image generated by the image sensor 301 can be improved.

As illustrated in FIG. 5, in the first embodiment, the conductor portions 700 are provided in the base body 550 of the image sensor 301. That is, the conductor portions 700 are included in the image sensor 301. The conductor portions 700 each include a conductive pattern 710 serving as an example of a third conductive pattern. The conductive pattern 710 is formed to extend in the Y-axis direction along a side of the ground pattern 504 extending in the Y-axis direction.

In addition, the conductor portions 700 each include a plurality of connection conductors that electrically interconnect the ground pattern 504 and the conductive pattern 710. The plurality of connection conductors are arranged at intervals in the Y-axis direction. In the first embodiment, the plurality of connection conductors are two connection conductors 711 and 712. The connection conductors 711 and 712 are each a conductive pattern. A position in the Z-axis direction in the conductive pattern 710 and the connection conductors 711 and 712 is the same as a position in the Z-axis direction in the ground pattern 504. That is, constituent members of the conductor portions 700 are disposed in the same layer as the ground pattern 504 in the base body 550. As a result of this, a conductor loop is not formed by the ground pattern 504 and the conductor portions 700 when the module body 310 is viewed from the side in the X-axis direction. A conductor loop is neither formed by the ground pattern 504 and the conductor portions 700 when the module body 310 is viewed from the side in the Y-axis direction. That is, a conductive loop is not formed by the ground pattern 504 and the conductor portions 700 when the module body 310 is viewed from the side in any direction perpendicular to the Z-axis direction. As a result of this, the quality of the image generated by the image sensor 301 can be effectively improved.

In addition, the conductor portions 700 are disposed on the outside of the region R200 surrounding the pixel portion 200 when the module body 310 is viewed in the Z-axis direction. As a result of this, the width of wiring constituting the mesh shape of the ground pattern 504 does not need to be increased, that is, the opening through which light passes does not need to be narrowed, and therefore the influence of the amount of light reaching the pixels 201 through the ground pattern 504, the reflection of the light, and so forth on the optical characteristics can be reduced. Therefore, the quality of the image generated by the image sensor 301 can be effectively improved.

The ground pattern 504 includes a plurality of wires 511 extending in the Y-axis direction and arranged at intervals in the X-axis direction, and a plurality of wires 512 extending in the X-axis direction and arranged at intervals in the Y-axis direction. The mesh shape is formed by crisscross arrangement of the plurality of wires 511 and the plurality of wires 512. The width of each of the wires 511 and 512 constituting the mesh shape is represented by D0. In addition, the width of each of the conductive patterns 710 is represented by D1. In addition, the width of each of the connection conductors 711 is represented by D2, and the width of each of the connection conductors 712 is represented by D3. In the present embodiment, the widths D1, D2, and D3 are each larger than the width D0. That is, as a result of the conductor portions 700, the voltage drop in the ground pattern 504 can be reduced without increasing the width D0 of the wires 511 and 512.

The connection conductors 711 and 712 of the two conductor portions 700 are preferably connected to the vicinity of four corners of the ground pattern 504 as viewed in the Z-axis direction. In addition, the connection conductors 711 and 712 are each preferably shorter.

To be noted, the connection conductors 711 and 712 may be omitted, and the conductive patterns 710 may be directly connected to respective sides of the ground pattern 504.

In addition, although a case where the module body 310 includes the two conductor portions 700 has been described, the configuration is not limited to this. For example, the module body 310 may include only one conductor portion that is connected in parallel to the ground pattern 504. In addition, the module body 310 may include three or more conductor portions connected in parallel to the ground pattern 504. In this case, one of the three or more conductor portions may be disposed in a different layer from the ground pattern 504.

In addition, although a case where the image sensor 301 is an image sensor of a front side illumination type has been described, the configuration is not limited to this. For example, the image sensor 301 may be an image sensor of aback side illumination type. Also in this case, the ground pattern 504 is preferably formed in a mesh shape, and this suppresses the warpage of the image sensor 301 caused by change in the temperature of the image pickup module 300.

Example 1

Example 1 corresponding to the first embodiment will be described below. To be noted, in the description below, electrical resistance will be also simply referred to as resistance.

The noise voltage generated at two ends of the ground pattern 504 in the Y-axis direction was evaluated with the resistance ratio of the resistance values that are coefficients of the formula (1). The following formula (2) was used for calculating the resistance values of the conductors.

$$R = \rho \times \frac{l}{S1} \quad (2)$$

In the formula (2), $\rho$ represents the resistivity [$\Omega$m] of the conductor, l represents the length [m] of the conductor, and S1 represents the area [m$^2$] of the conductor.

In the description below, the resistance value of the ground pattern 504 is represented by R1, the combined resistance value of the two conductive patterns 710 is represented by R2, and the resistance value of the ground pattern 604 is represented by R3. Further, the combined resistance value of the two connection conductors 711 is represented by R4, and the combined resistance value of the two connection conductors 712 is represented by R5. The combined resistance value of the nine connection conductor portions 391 is represented by R6, and the combined resistance value of the nine connection conductor portions 392 is represented by R7.

In addition, the resistance values of the pads 551 and 651 in each of the nine connection conductor portions 391 were neglected. In addition, the combined resistance value of the nine connection lines 561 is represented by R6a, the combined resistance value of the nine wires 351 is represented by R6b, and the combined resistance value of the nine via conductors 671 is represented by R6c. That is, R6=R6a+R6b+R6c holds.

In addition, the resistance values of the pads 552 and 652 in each of the nine connection conductor portions 392 were neglected. In addition, the combined resistance value of the nine connection lines 562 is represented by R7a, the combined resistance value of the nine wires 352 is represented by R7b, and the combined resistance value of the nine via conductors 672 is represented by R7c. That is, R7=R7a+R7b+R7c holds.

The formula (1) can be converted to a formula (3) by applying the conditions described above to the formula (1) and representing the induced noise voltage at the two ends of the ground pattern 504 in the Y direction by $V_{noise}$.

$$V_{noise} = -\alpha \times \frac{\frac{1}{\frac{1}{R1} + \frac{1}{R2 + R4 + R5}}}{\frac{1}{\frac{1}{R1} + \frac{1}{R2 + R4 + R5}} + R3 + R6 + R7} \times \frac{d}{dt}\oint_{S0} B \cdot n ds \quad (3)$$

Here, S0 represents the area of the region inside the loop structure L1 when the module body 310 is viewed from the side in the X-axis direction. When the combined resistance value of the ground pattern 504 of the image sensor 301 and the two conductor portions 700 is represented by A, the resistance value A is expressed by the following formula (4).

$$A = \frac{1}{\frac{1}{R1} + \frac{1}{R2 + R4 + R5}} \quad (4)$$

In addition, when the combined resistance value of the ground pattern 604 of the printed wiring board 302, the nine connection conductor portions 391, and the nine connection conductor portions 392 is represented by B, the resistance value B is expressed by the following formula (5).

$$B = R3 + R6 + R7 \quad (5)$$

First, the resistance value calculated in Example 1 will be described. The width D0, thickness, and length of each of the wires 511 and 512 in the ground pattern 504 were respectively set to 0.7 μm, 0.6 μm, and 20 mm. In addition, aluminum (Al) was set as the material of the ground pattern 504, and the resistivity of the ground pattern 504 was set to 2.82×10$^{-8}$ Ωm. In addition, the number of the wires 512 was set to 6000. As a result of this, the resistance value R1 was 0.224Ω.

The two conductor portions 700 were formed in symmetrical shapes in the left-right direction as illustrated in FIG. 5. In each of the conductor portions 700, the width D1, thickness, and length of the conductive pattern 710 were respectively set to 1000 µm, 0.6 µm, and 20 mm. In addition, aluminum (Al) was set as the material of the conductive patterns 710, and the resistivity of the conductive patterns 710 was set to $2.82 \times 10^{-8}$ Ωm. As a result of this, the resistance value R2 was 0.47Ω.

The width D2, thickness, and length of the connection conductor 711 were respectively set to 500 µm, 0.6 µm, and 100 µm. In addition, aluminum (Al) was set as the material of the connection conductors 711, and the resistivity of the connection conductors 711 was set to $2.82 \times 10^{-8}$ Ωm. As a result of this, the resistance value R4 was 0.0047Ω.

The width D3, thickness, and length of the connection conductor 712 were respectively set to 500 µm, 0.6 µm, and 100 µm. In addition, aluminum (Al) was set as the material of the connection conductors 712, and the resistivity of the connection conductors 712 was set to $2.82 \times 10^{-8}$ Ωm. As a result of this, the resistance value R5 was 0.0047Ω.

The nine connection conductor portions 391 were formed to have the same shape and size. The width, thickness, and length of each of the connection lines 561 were respectively set to 20 µm, 0.6 µm, and 2 mm. In addition, aluminum (Al) was set as the material of the connection lines 561, and the resistivity of the connection lines 561 was set to $2.82 \times 10^{-8}$ Ωm. As a result of this, the resistance value R6a was 0.522Ω.

The nine connection conductor portions 392 were formed to have the same shape and size. The width, thickness, and length of each of the connection lines 562 were respectively set to 20 µm, 0.6 µm, and 2 mm. In addition, aluminum (Al) was set as the material of the connection lines 562, and the resistivity of the connection lines 562 was set to $2.82 \times 10^{-8}$ Ωm. As a result of this, the resistance value R7a was 0.522Ω.

The diameter and length of each of the wires 351 were respectively set to 20 µm and 1.6 mm. In addition, gold (Au) was set as the material of the wires 351, and the resistivity of the wires 351 was set to $2.44 \times 10^{-8}$ Ωm. As a result of this, the resistance value R6b was 0.014Ω.

The diameter and length of each of the wires 352 were respectively set to 20 µm and 1.6 mm. In addition, gold (Au) was set as the material of the wires 352, and the resistivity of the wires 352 was set to $2.44 \times 10^{-8}$ Ωm. As a result of this, the resistance value R7b was 0.014Ω.

The diameter and length of each of the via conductors 671 were respectively set to 100 µm and 80 µm. In addition, copper (Cu) was set as the material of the via conductors 671, and the resistivity of the via conductors 671 was set to $1.68 \times 10^{-8}$ Ωm. As a result of this, the resistance value R6c was $1.90 \times 10^{-5}$ Ω.

The diameter and length of each of the via conductors 672 were respectively set to 100 µm and 80 µm. In addition, copper (Cu) was set as the material of the via conductors 672, and the resistivity of the via conductors 672 was set to $1.68 \times 10^{-8}$ Ωm. As a result of this, the resistance value R7c was $1.90 \times 10^{-5}$ Ω.

The ground pattern 604 was formed in a rectangular shape as viewed in the Z-axis direction. The width, thickness, and length of the ground pattern 604 were respectively set to 36 mm, 15 µm, and 26 mm. In addition, copper (Cu) was set as the material of the ground pattern 604, and the resistivity of the ground pattern 604 was set to $1.68 \times 10^{-8}$ Ωm. As a result of this, the resistance value R3 was 0.0008Ω.

Therefore, in Example 1, the resistance value A was 0.152Ω, and the resistance value B was 1.073Ω. Therefore, in Example 1, B>A held. In addition, in Example 1, the resistance ratio A/(A+B) was 0.124. Here, the resistance ratio A/(A+B) corresponds to the resistance ratio of the formulae (1) and (3).

In addition, in Example 1, R1=0.224Ω, R2=0.47Ω, R4=0.0047Ω, and R5=0.0047Ω held. Therefore, in Example 1, R1<R2+R4+R5 held.

Comparative Example 1

Next, Comparative Example 1 corresponding to the comparative example will be described. In the module body 310X of Comparative Example 1, the two conductor portions 700 are omitted from the module body 310 of Example 1. In the module body 310X of Comparative Example 1, the size and physical properties of the other elements are the same as in the module body 310 of Example 1. Therefore, in Comparative Example 1, similarly to Example 1, the resistance value R1 was 0.224Ω. In addition, in Comparative Example 1, similarly to Example 1, the resistance value R6a was 0.522Ω, and the resistance value R7a was 0.522Ω. In addition, in Comparative Example 1, similarly to Example 1, the resistance value R6b was 0.014Ω, and the resistance value R7b was 0.014Ω. In addition, in Comparative Example 1, similarly to Example 1, the resistance value R6c was $1.90 \times 10^{-5}$ Ω, and the resistance value R7c was $1.90 \times 10^{-5}$ Ω. In addition, in Comparative Example 1, similarly to Example 1, the resistance value R3 was 0.0008Ω.

Therefore, in Comparative Example 1, the resistance value A was the resistance value R1, which was 0.224Ω. In addition, in Comparative Example 1, similarly to Example 1, the resistance value B was 1.073Ω. In Comparative Example 1, the resistance ratio A/(A+B) was 0.173.

Figure 8:
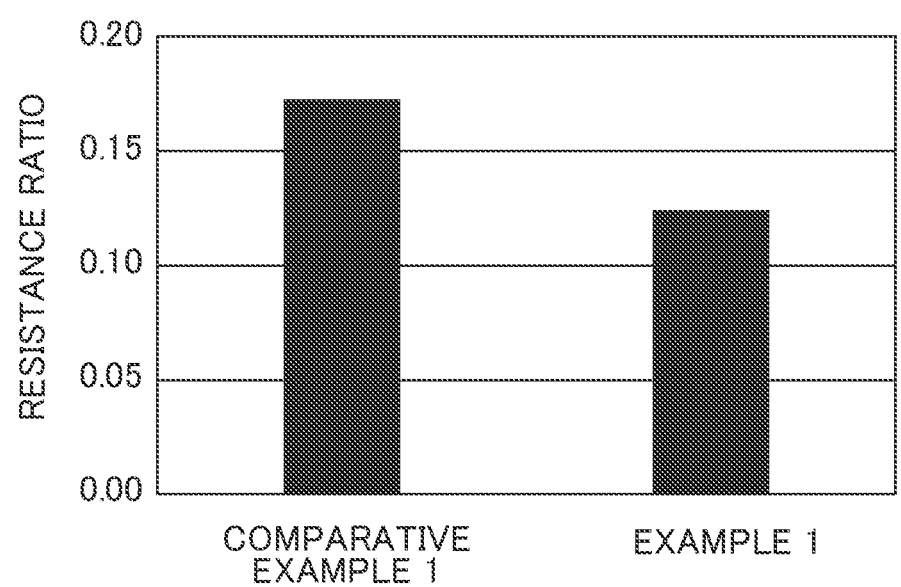
FIG. 8 is a graph of Example 1 and Comparative Example 1.

FIG. 8 is a graph of the resistance ratio A/(A+B) of Example 1 and Comparative Example 1. The resistance ratio A/(A+B) is proportional to the induced noise voltage $V_{noise}$. That is, the resistance ratio A/(A+B) is also a standardized value of the induced noise voltage $V_{noise}$. Since the resistance ratio was 0.173 in Comparative Example 1 and 0.124 in Example 1, the amount of decrease in the induced noise voltage $V_{noise}$ of Example 1 with respect to Comparative Example 1 was about 28.0%. Therefore, it was confirmed that the induced noise voltage $V_{noise}$ was reduced in Example 1 with respect to Comparative Example 1.

Second Embodiment

Figure 9A:
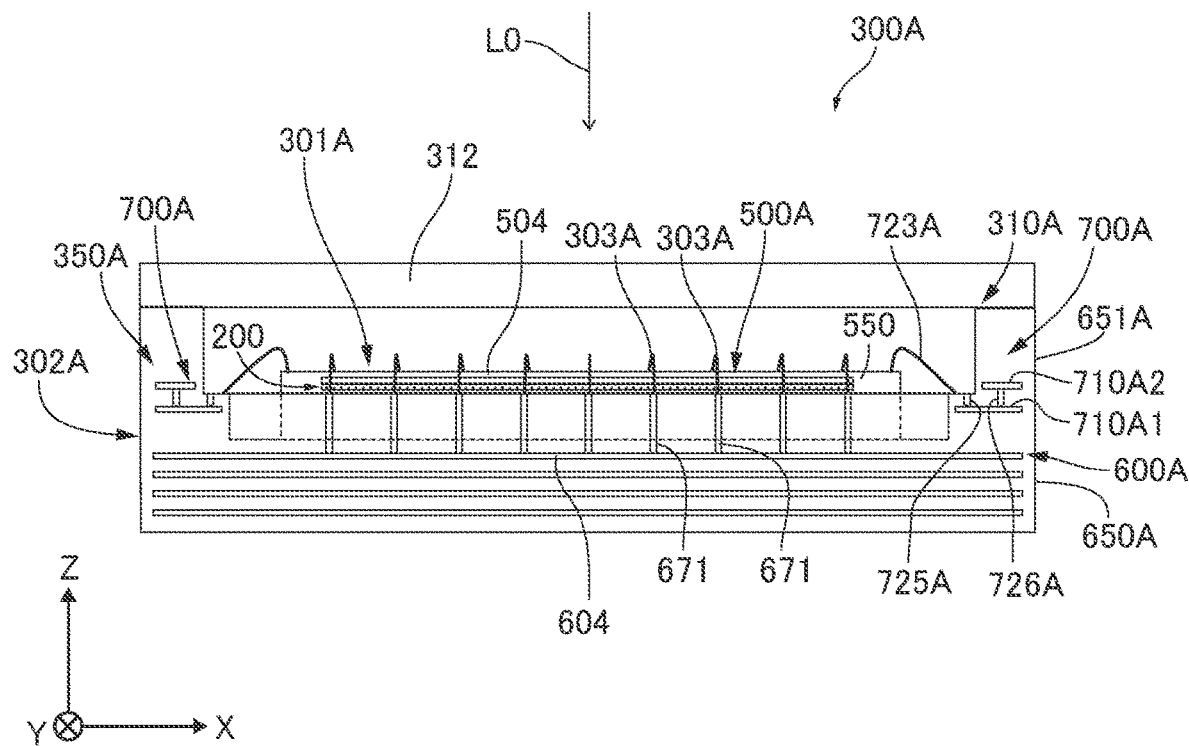
FIG. 9A is a section view of an image pickup module according to a second embodiment.
Figure 9B:
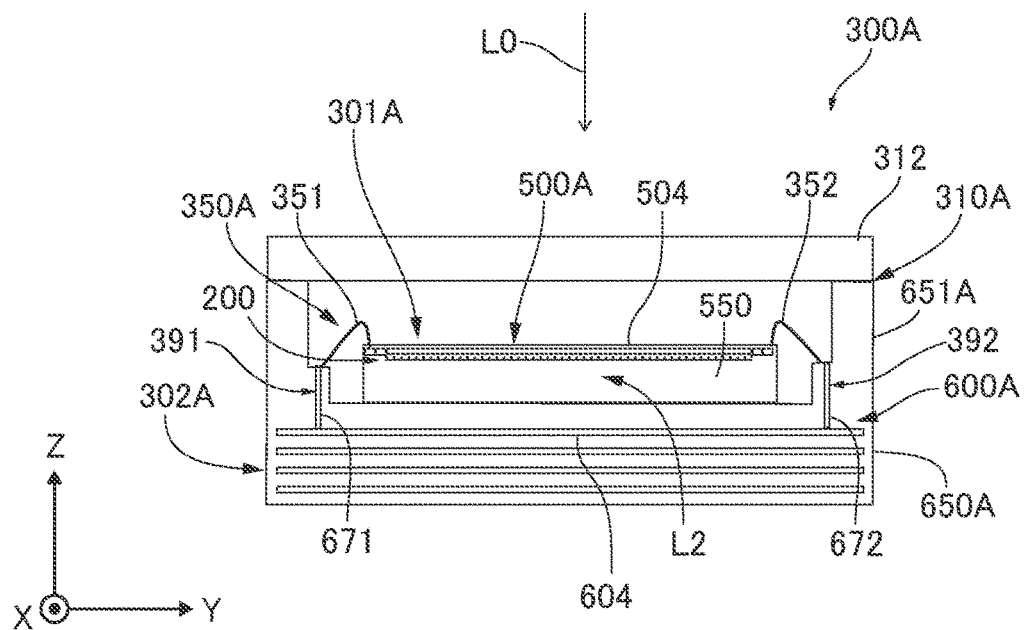
FIG. 9B is a section view of the image pickup module according to the second embodiment.
Figure 10:
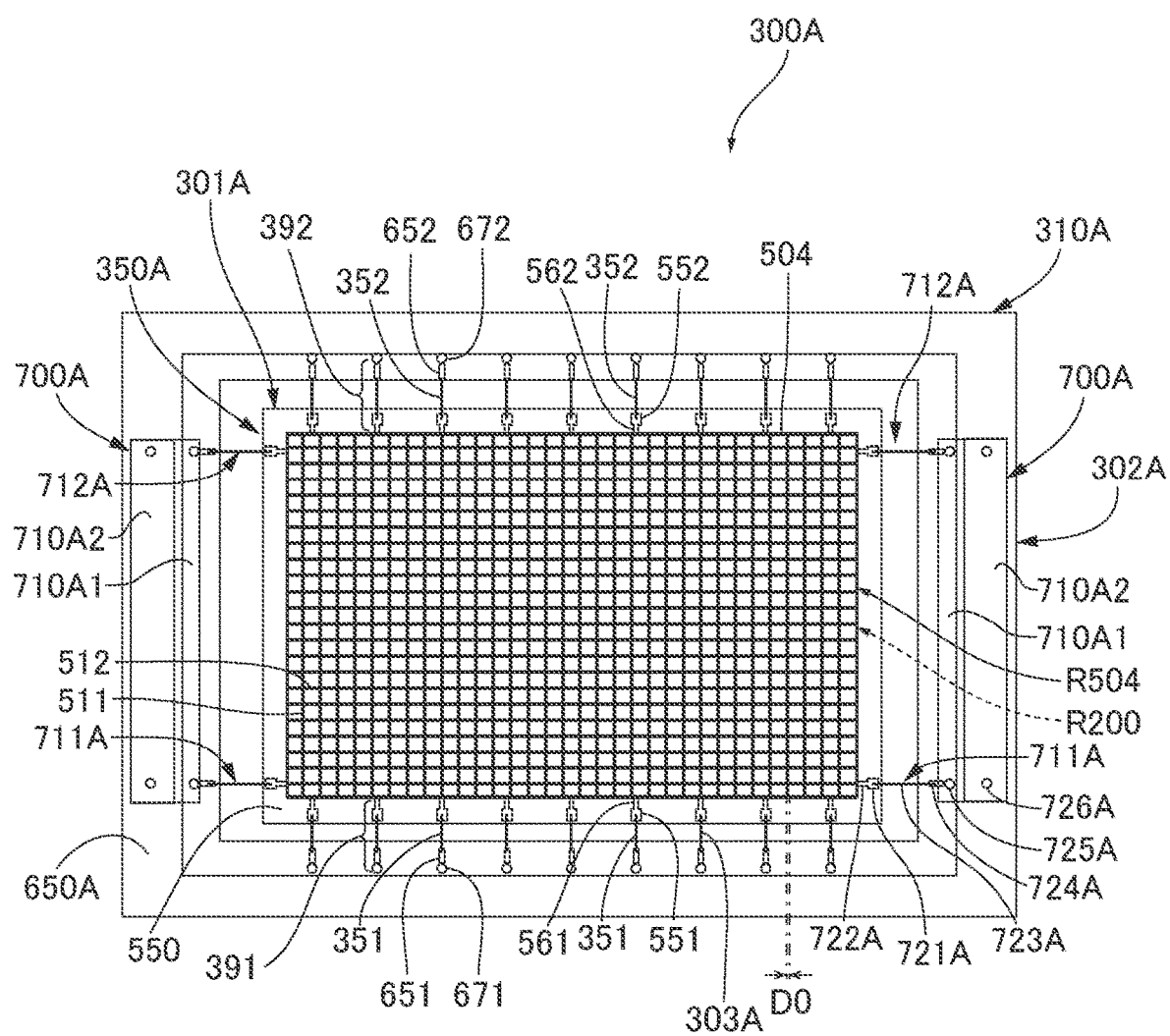
FIG. 10 is a plan view of the image pickup module according to the second embodiment.

Next, an image pickup module according to a second embodiment will be described. FIGS. 9A and 9B are each a section view of an image pickup module 300A according to the second embodiment. FIG. 10 is a plan view of the image pickup module 300A according to the second embodiment. In the second embodiment, elements substantially the same as in the first embodiment will be denoted by the same reference signs, and detailed description thereof will be omitted. The image pickup apparatus of the second embodiment includes an image pickup module 300A instead of the image pickup module 300 in FIG. 1.

FIG. 9A is a schematic section view of the image pickup module 300A taken along the X-Z plane. FIG. 9B is a schematic section view of the image pickup module 300A taken along the Y-Z plane. FIG. 10 is a schematic plan view of the image pickup module 300A as viewed in a direction perpendicular to the X-Y plane.

The image pickup module 300A includes a module body 310A and the cover glass 312. To be noted, in FIG. 10, illustration of the cover glass 312 is omitted. The module body 310A includes an image sensor 301A and a printed wiring board 302A on which the image sensor 301A is mounted.

The printed wiring board 302A includes wiring such as a power supply line, a ground line, and a signal line. In addition, the printed wiring board 302A is a rigid wiring board. In the present embodiment, the image sensor 301A and the printed wiring board 302A are connected to each other by wire bonding. That is, the module body 310A includes a plurality of wires 303A electrically interconnecting the image sensor 301A and the printed wiring board 302A as illustrated in FIG. 10. The wires 303A are each formed from metal such as gold. These wires 303A are also referred to as bonding wires.

The module body 310A includes a ground line 350A. To be noted, FIG. 10 illustrates wires 351, 352, and 723A serving as apart of the ground line 350A among the plurality of wires 303A. The ground line 350A is connected to the negative electrode side of the battery that is a direct current power source.

The image sensor 301A is a CCD image sensor or a CMOS image sensor, and, in the present embodiment, a case where the image sensor 301A is a CMOS image sensor will be described below. In addition, the image sensor 301A is an image sensor of a front side illumination type. The image sensor 301A includes the base body 550 serving as an example of a first base body and the pixel portion 200 similarly to the first embodiment, and a ground wiring portion 500A. The pixel portion 200 and the ground wiring portion 500A are provided in the base body 550. The ground wiring portion 500A is included in the ground line 350A. The ground wiring portion 500A is formed from metal such as copper, aluminum, or tungsten.

The ground wiring portion 500A is used for applying a voltage to each pixel 201 of the pixel portion 200 illustrated in FIG. 3. Specifically, the ground wiring portion 500A is used for applying a ground potential to each pixel 201 among a power source potential and the ground potential.

The ground wiring portion 500A includes the ground pattern 504 serving as an example of a first conductive pattern similarly to the first embodiment. Similarly to the first embodiment, the region R504 surrounds the ground pattern 504 when the module body 310A is viewed in the Z-axis direction. In addition, similarly to the first embodiment, the region R200 surrounds the pixel portion 200 when the module body 310A is viewed in the Z-axis direction. The region R504 overlaps with part or the entirety of the region R200 when the module body 310A is viewed in the Z-axis direction. In the present embodiment, the region R504 overlaps with the entirety of the region R200 when the module body 310A is viewed in the Z-axis direction. That is, the region R504 includes the region R200 when the module body 310A is viewed in the Z-axis direction.

Similarly to the first embodiment, the ground pattern 504 is disposed on the light incident side of the pixel portion 200, that is, disposed on the side on which the light L0 is incident on the photodiode 211 of each pixel 201 of the pixel portion 200 illustrated in FIG. 3. In addition, similarly to the first embodiment, the ground pattern 504 is formed in a mesh shape such that the light L0 passes therethrough to the photodiode 211 of each pixel 201. That is, the ground pattern 504 includes the plurality of wires 511 extending in the Y-axis direction and arranged at intervals in the X-axis direction, and the plurality of wires 512 extending in the X-axis direction and arranged at intervals in the Y-axis direction. The mesh shape is formed by crisscross arrangement of the plurality of wires 511 and the plurality of wires 512. The light L0 is incident on the photodiode 211 of each pixel 201 of the pixel portion 200 through the mesh shape of the ground pattern 504. In addition, since the ground pattern 504 has a mesh shape, warpage of the image sensor 301A caused by change in the temperature of the image pickup module 300A can be suppressed.

The printed wiring board 302A includes a base body 650A serving as an example of a second base body, and a ground wiring portion 600A provided in the base body 650A. The base body 650A is, for example, an insulating substrate formed from an insulating material such as glass epoxy resin or ceramics. Although the frame member 311 is sandwiched between the cover glass 312 and the base body 650 in the first embodiment described above as illustrated in FIGS. 4A and 4B, the frame member is not provided in the second embodiment. As illustrated in FIGS. 9A and 9B, the base body 650A of the second embodiment includes a projection portion 651A surrounding the image sensor 301A and corresponding to the frame member. The cover glass 312 is fixed to the upper surface of the projection portion 651A of the base body 650A with an adhesive or the like. As described above, the base body 650A is a cavity substrate, and the surface of the base body 650A on which the image sensor 301A is provided is formed in a recessed shape. The cavity substrate is a counterbore substrate or a laminated substrate.

The ground wiring portion 600A is included in the ground line 350A. The ground wiring portion 600A is formed from metal such as copper, aluminum, or tungsten. The ground wiring portion 600A includes the ground pattern 604 serving as an example of a second conductive pattern similarly to the first embodiment. For example, the ground pattern 604 is disposed in an inner layer of the base body 650A of the printed wiring board 302A.

The ground pattern 504 and the ground pattern 604 are electrically connected to each other by at least one, for example, nine connection conductor portions 391 and at least one, for example, nine connection conductor portions 392 similarly to the first embodiment.

As illustrated in FIG. 10, the connection conductor portions 391 each include a pad 551, a connection line 561, a wire 351, a pad 651, and a via conductor 671 similarly to the first embodiment. In addition, the connection conductor portions 392 each include a pad 552, a connection line 562, a wire 352, a pad 652, and a via conductor 672 similarly to the first embodiment.

As illustrated in FIG. 9B, part of the ground line 350A forms a loop structure L2 formed from a conductor when the module body 310A is viewed from the side in the X-axis direction. The loop structure L2 includes the ground pattern 504, the ground pattern 604, the connection conductor portions 391, and the connection conductor portions 392. The magnetic fields 150 and 151 illustrated in FIG. 1 cross the loop structure L2. Therefore, an induced current is generated in the loop structure L2. This induced current generates a noise voltage in the pixels 201 of the pixel portion 200 illustrated in FIG. 3.

In the second embodiment, the ground line 350A of the module body 310A includes at least one conductor portion connected in parallel to the ground pattern 504 in addition to the ground pattern 604. The at least one conductor portion is two conductor portions 700A in the second embodiment.

In the second embodiment, the conductor portions 700A are each formed to extend from the image sensor 301A to the printed wiring board 302A. The specific configuration of the conductor portions 700A will be described below.

The conductor portions 700A each include two conductive patterns 710A1 and 710A2 serving as an example of at least one fourth conductive pattern provided in the base body 650A. The conductive patterns 710A1 and 710A2 are each disposed in an inner layer of the base body 650A. The conductive patterns 710A1 and 710A2 are each formed to extend in the Y-axis direction along a side of the ground pattern 504 extending in the Y-axis direction. To be noted, in FIG. 10, the conductive patterns 710A1 and 710A2 covered by the base body 650A are indicated by solid lines for the sake of description. The conductive patterns 710A1 and 710A2 are disposed in the projection portion 651A of the base body 650A so as to be close to the ground pattern 504 in the Z-axis direction. This is employed for making an unillustrated loop structure including the conductor portions 700A and the ground pattern 504 different from the loop structure L2 be as small as possible when the module body 310A is viewed from the side in the X-axis direction.

In addition, the conductor portions 700A each include a plurality of connection conductors that electrically interconnect the ground pattern 504 and the conductive patterns 710A1 and 710A2. The plurality of connection conductors are arranged at intervals in the Y-axis direction. In the second embodiment, the plurality of connection conductors are two connection conductors 711A and 712A as illustrated in FIG. 10. In the second embodiment, the connection conductors 711A and 712A have substantially the same configurations, and the connection conductor 711A will be described in detail below. The connection conductor 711A includes a pad 721A, a connection line 722A, a wire 723A, a pad 724A, a via conductor 725A, and a via conductor 726A.

The pad 721A and the connection line 722A are included in the ground wiring portion 500A of the image sensor 301A. That is, the pad 721A and the connection line 722A are provided in the base body 550. The pad 721A and the ground pattern 504 are interconnected by the connection line 722A.

The pad 724A, the via conductor 725A, and the via conductor 726A are included in the ground wiring portion 600A of the printed wiring board 302A. That is, the pad 724A, the via conductor 725A, and the via conductor 726A are provided in the base body 650A. In the printed wiring board 302A, the pad 724A and the conductive pattern 710A1 are interconnected by the via conductor 725A, and the conductive pattern 710A1 and the conductive pattern 710A2 are interconnected by the via conductor 726A.

The pad 721A of the image sensor 301A and the pad 724A of the printed wiring board 302A are interconnected by the wire 723A. In the configuration described above, a parallel circuit of the ground pattern 504 and the conductor portions 700A is formed.

The parallel circuit of the ground pattern 504 and the conductor portions 700A reduces the resistance ratio of the formula (1). The reduction of the resistance ratio reduces the induced noise voltage $V_{cmos}$. As a result of this, superposition of a noise on a generated image can be reduced. Therefore, the quality of an image generated by the image sensor 301A can be improved.

In addition, voltage drop in the ground pattern 504 can be reduced, and the direct current voltage applied to the pixels 201 being lower than the reference voltage can be suppressed. As a result of this, occurrence of unevenness such as a smear or shading in the image generated by the image sensor 301A can be suppressed. Therefore, the quality of an image generated by the image sensor 301A can be improved.

In addition, since the conductive patterns 710A1 and 710A2 are disposed in the base body 650A of the printed wiring board 302A, the thickness can be increased as compared with a case where the conductive patterns 710A and 710A2 are provided in the image sensor 301A. As a result of this, the electrical resistance value of the conductor portions 700A can be reduced further, and the voltage drop in the ground pattern 504 can be more effectively reduced. Therefore, the quality of the image generated by the image sensor 301A can be further improved.

To be noted, although a case where at least one fourth conductive pattern disposed in the base body 650A is the two conductive patterns 710A1 and 710A2 has been described, the configuration is not limited to this. The at least one fourth conductive pattern may be one, three, or more conductive patterns.

In addition, although a case where the module body 310A includes the two conductor portions 700A has been described, the configuration is not limited to this. For example, the module body 310A may include only one conductor portion that is connected in parallel to the ground pattern 504. In addition, the module body 310A may include three or more conductor portions connected in parallel to the ground pattern 504.

In addition, although a case where the image sensor 301A is an image sensor of a front side illumination type has been described, the configuration is not limited to this. For example, the image sensor 301A may be an image sensor of a back side illumination type. Also in this case, the ground pattern 504 is preferably formed in a mesh shape, and this suppresses the warpage of the image sensor 301A caused by change in the temperature of the image pickup module 300A.

Example 2

Example 2 corresponding to the second embodiment will be described below. Similarly to Example 1, the noise voltage generated at two ends of the ground pattern 504 in the Y-axis direction was evaluated by using the formula (3) related to the formula (1).

In the description below, the resistance value of the ground pattern 504 is represented by R1, the combined resistance value of the two conductive patterns 710A1 and the two conductive patterns 710A2 is represented by R2, and the resistance value of the ground pattern 604 is represented by R3. Further, the combined resistance value of the two connection conductors 711A is represented by R4, and the combined resistance value of the two connection conductors 712A is represented by R5. The combined resistance value of the nine connection conductor portions 391 is represented by R6, and the combined resistance value of the nine connection conductor portions 392 is represented by R7.

In addition, the resistance values of the pads 551 and 651 in each of the nine connection conductor portions 391 were neglected. In addition, the combined resistance value of the nine connection lines 561 is represented by R6a, the combined resistance value of the nine wires 351 is represented by R6b, and the combined resistance value of the nine via conductors 671 is represented by R6c. That is, R6=R6a+R6b+R6c holds.

In addition, the resistance values of the pads 552 and 652 in each of the nine connection conductor portions 392 were neglected. In addition, the combined resistance value of the nine connection lines 562 is represented by R7a, the combined resistance value of the nine wires 352 is represented by R7b, and the combined resistance value of the nine via conductors 672 is represented by R7c. That is, R7=R7a+R7b+R7c holds.

In addition, in each of the two connection conductors 711A, the resistance values of the pads 721A and 724A were neglected. In addition, the combined resistance value of the two connection lines 722A of the two connection conductors 711A is represented by R4a. The combined resistance value of the two wires 723A of the two connection conductors 711A is represented by R4b. The combined resistance value of the two via conductors 725A and the two via conductors 726A of the two connection conductors 711A is represented by R4c. That is, R4=R4a+R4b+R4c holds.

In addition, in each of the two connection conductors 712A, the resistance values of the pads 721A and 724A were neglected. In addition, the combined resistance value of the two connection lines 722A of the two connection conductors 712A is represented by R5a. The combined resistance value of the two wires 723A of the two connection conductors 712A is represented by R5b. The combined resistance value of the two via conductors 725A and the two via conductors 726A of the two connection conductors 712A is represented by R5c. That is, R5=R5a+R5b+R5c holds.

The resistance values calculated in Example 2 will be described. The width D0, thickness, and length of each of the wires 511 and 512 in the ground pattern 504 were respectively set to 0.7 μm, 0.6 μm, and 20 mm. In addition, aluminum (Al) was set as the material of the ground pattern 504, and the resistivity of the ground pattern 504 was set to $2.82 \times 10^{-8}$ Ωm. In addition, the number of the wires 512 was set to 6000. As a result of this, the resistance value R1 was 0.224Ω.

The two conductor portions 700A were formed in symmetrical shapes in the left-right direction as illustrated in FIG. 10. In each of the conductor portions 700A, the width, thickness, and length of each of the conductive patterns 710A1 and 710A2 were respectively set to 3 mm, m, and 20 mm. In addition, copper (Cu) was set as the material of the conductive patterns 710A1 and 710A2, and the resistivity of the conductive patterns 710A1 and 710A2 was set to $1.68 \times 10^{-8}$ Ωm. As a result of this, the resistance value R2 was 0.0019Ω.

The two connection conductors 711A and the two connection conductors 712A were formed to have the same configuration. The width, thickness, and length of each of the connection lines 722A were respectively set to 500 μm, 0.6 μm, and 2 mm. In addition, aluminum (Al) was set as the material of the connection lines 722A, and the resistivity of the connection lines 722A was set to $2.82 \times 10^{-8}$ Ωm. As a result of this, the resistance value R4a was 0.0094Ω, and the resistance value R5a was 0.0094Ω.

The diameter and length of each of the wires 723A were respectively set to 20 μm and 1.0 mm. In addition, gold (Au) was set as the material of the wires 723A, and the resistivity of the wires 723A was set to $2.44 \times 10^{-8}$ Ωm. As a result of this, the resistance value R4b was 0.039Ω, and the resistance value R5b was 0.039Ω.

The via conductors 725A and 726A were formed to have the same configuration. The diameter and length of each of the via conductors 725A and 726A were respectively set to 100 μm, and 80 μm. In addition, copper (Cu) was set as the material of the via conductors 725A and 726A, and the resistivity of the via conductors 725A and 726A was set to $1.68 \times 10^{-8}$ Ωm. As a result of this, the resistance value R4c was $4.28 \times 10^{-5}$Ω, and the resistance value R5c was $4.28 \times 10^{-5}$Ω.

The nine connection conductor portions 391 were formed to have the same shape and size. The width, thickness, and length of each of the connection lines 561 were respectively set to 20 μm, 0.6 μm, and 2 mm. In addition, aluminum (Al) was set as the material of the connection lines 561, and the resistivity of the connection lines 561 was set to $2.82 \times 10^{-8}$ Ωm. As a result of this, the resistance value R6a was 0.522Ω.

The nine connection conductor portions 392 were formed to have the same shape and size. The width, thickness, and length of each of the connection lines 562 were respectively set to 20 μm, 0.6 μm, and 2 mm. In addition, aluminum (Al) was set as the material of the connection lines 562, and the resistivity of the connection lines 562 was set to $2.82 \times 10^{-8}$ Ωm. As a result of this, the resistance value R7a was 0.522Ω.

The diameter and length of each of the wires 351 were respectively set to 20 μm and 1.6 mm. In addition, gold (Au) was set as the material of the wires 351, and the resistivity of the wires 351 was set to $2.44 \times 10^{-8}$ Ωm. As a result of this, the resistance value R6b was 0.014Ω.

The diameter and length of each of the wires 352 were respectively set to 20 μm and 1.6 mm. In addition, gold (Au) was set as the material of the wires 352, and the resistivity of the wires 352 was set to $2.44 \times 10^{-8}$ Ωm. As a result of this, the resistance value R7b was 0.014Ω.

The diameter and length of each of the via conductors 671 were respectively set to 100 μm, and 80 μm. In addition, copper (Cu) was set as the material of the via conductors 671, and the resistivity of the via conductors 671 was set to $1.68 \times 10^{-8}$ Ωm. As a result of this, the resistance value R6c was $1.90 \times 10^{-5}$Ω.

The diameter and length of each of the via conductors 672 were respectively set to 100 μm, and 80 μm. In addition, copper (Cu) was set as the material of the via conductors 672, and the resistivity of the via conductors 672 was set to $1.68 \times 10^{-8}$ Ωm. As a result of this, the resistance value R7c was $1.90 \times 10^{-5}$Ω.

The ground pattern 604 was formed in a rectangular shape as viewed in the Z-axis direction. The width, thickness, and length of the ground pattern 604 were respectively set to 36 mm, 15 μm, and 26 mm. In addition, copper (Cu) was set as the material of the ground pattern 604, and the resistivity of the ground pattern 604 was set to $1.68 \times 10^{-8}$ Ωm. As a result of this, the resistance value R3 was 0.0008Ω.

Therefore, in Example 2, the resistance value A was 0.068Ω, and the resistance value B was 1.073Ω. Therefore, in Example 2, B>A held. In addition, in Example 2, the resistance ratio A/(A+B) was 0.059. Here, the resistance ratio A/(A+B) corresponds to the resistance ratio of the formulae (1) and (3).

In Comparative Example 1, the resistance value A was the resistance value R1, which was 0.224Ω. In addition, in Comparative Example 1, the resistance value B was 1.073Ω similarly to Example 2. In Comparative Example 1, the resistance ratio A/(A+B) was 0.173.

In addition, in Example 2, R1=0.224Ω, R2=0.0019Ω, R4=0.094+0.039+$4.28 \times 10^{-5}$Ω, and R5=0.094+0.039+$4.28 \times 10^{-5}$Ω held. Therefore, in Example 2, R1<R2+R4+R5 held.

Figure 11:
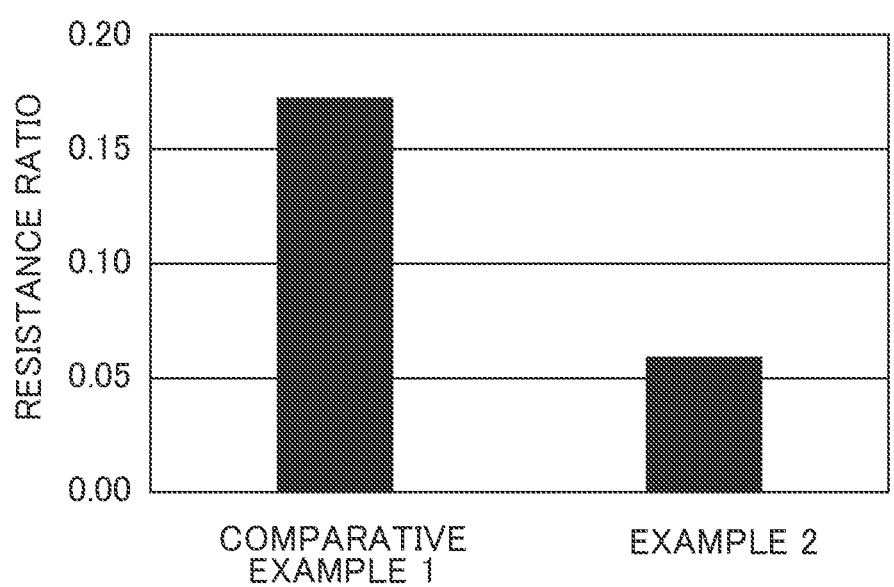
FIG. 11 is a graph of Example 2 and Comparative Example 1.

FIG. 11 is a graph of the resistance ratio A/(A+B) of Example 2 and Comparative Example 1. The resistance ratio A/(A+B) is proportional to the induced noise voltage $V_{noise}$. That is, the resistance ratio A/(A+B) is also a standardized value of the induced noise voltage $V_{noise}$. Since the resistance ratio was 0.173 in Comparative Example 1 and 0.059 in Example 2, the amount of decrease in the induced noise voltage $V_{noise}$ of Example 2 with respect to Comparative Example 1 was about 65.7%. Therefore, it was confirmed that the induced noise voltage $V_{noise}$ was reduced in Example 2 with respect to Comparative Example 1.

Third Embodiment

Figure 12A:
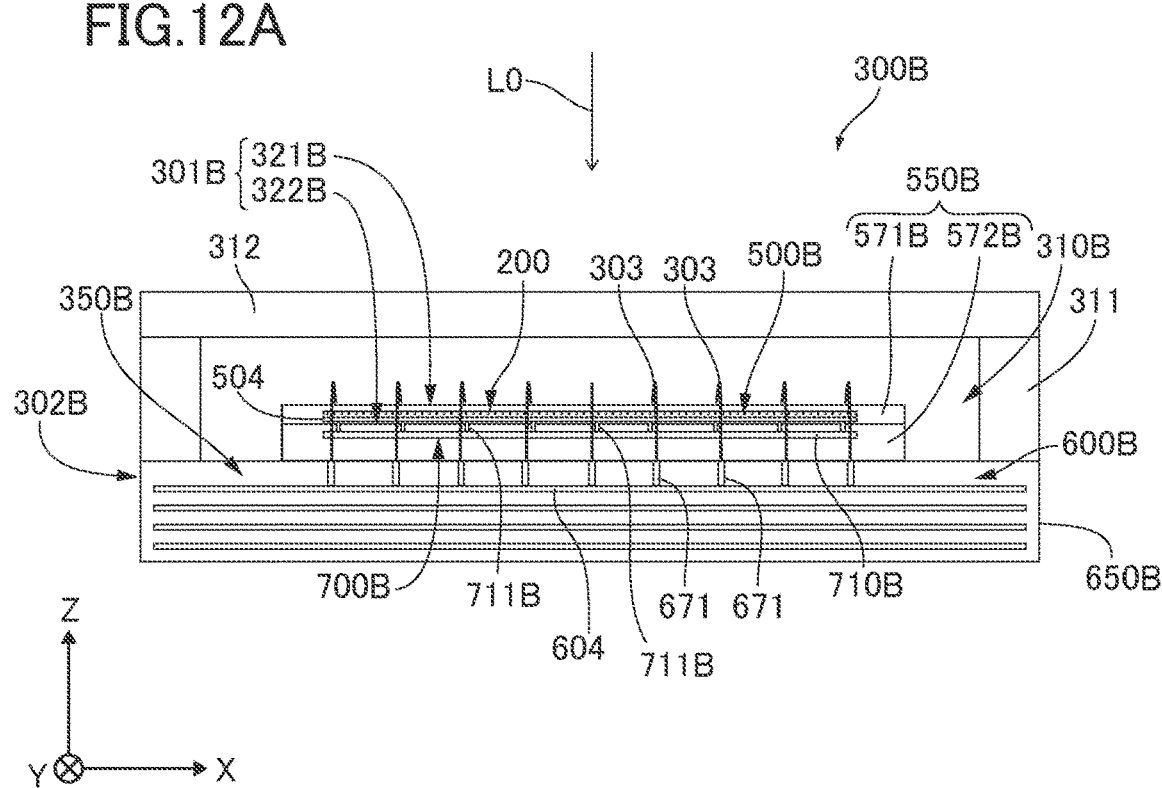
FIG. 12A is a section view of an image pickup module according to a third embodiment.
Figure 12B:
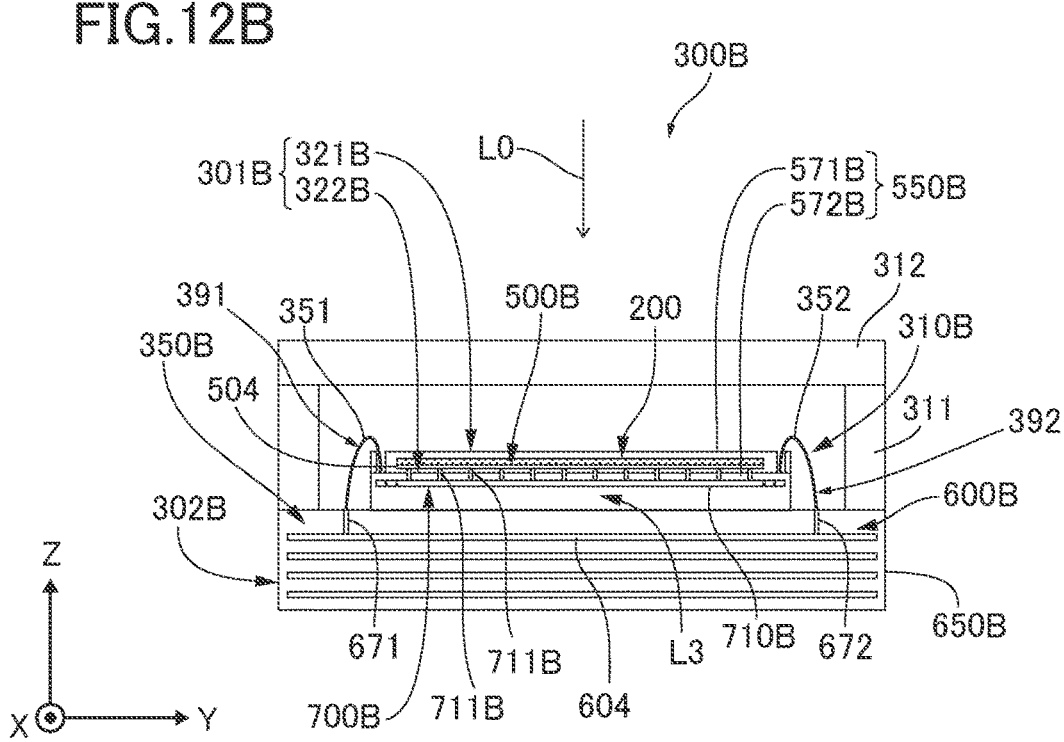
FIG. 12B is a section view of the image pickup module according to the third embodiment.
Figure 13:
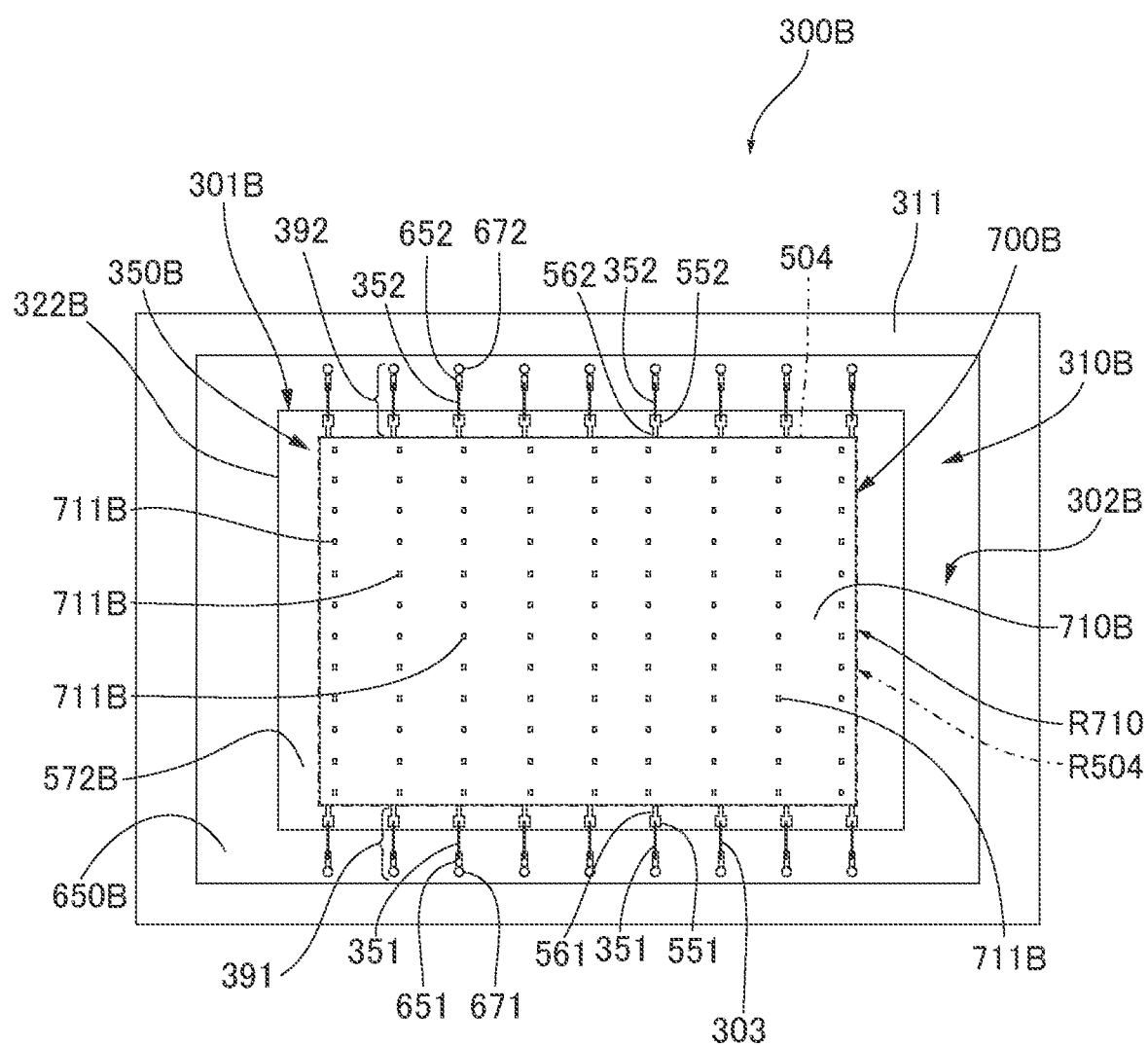
FIG. 13 is a plan view of the image pickup module according to the third embodiment.

Next, an image pickup module according to a third embodiment will be described. FIGS. 12A and 12B are each a section view of an image pickup module 300B according to the third embodiment. FIG. 13 is a plan view of the image pickup module 300B according to the third embodiment. In the third embodiment, elements substantially the same as in the first embodiment will be denoted by the same reference signs, and detailed description thereof will be omitted. The image pickup apparatus of the third embodiment includes an image pickup module 300B instead of the image pickup module 300 in FIG. 1.

FIG. 12A is a schematic section view of the image pickup module 300B taken along the X-Z plane. FIG. 12B is a schematic section view of the image pickup module 300B taken along the Y-Z plane. FIG. 13 is a schematic plan view of the image pickup module 300B as viewed in a direction perpendicular to the X-Y plane.

The image pickup module 300B includes a module body 310B, the frame member 311, and the cover glass 312. To be noted, in FIG. 13, illustration of the cover glass 312 is omitted. The module body 310B includes an image sensor 301B and a printed wiring board 302B on which the image sensor 301B is mounted.

The printed wiring board 302B includes wiring such as a power supply line, a ground line, and a signal line. In addition, the printed wiring board 302B is a rigid wiring board. In the present embodiment, the image sensor 301B and the printed wiring board 302B are connected to each other by wire bonding. That is, the module body 310B includes a plurality of wires 303 electrically interconnecting the image sensor 301B and the printed wiring board 302B as illustrated in FIG. 13. The wires 303 are each formed from metal such as gold. These wires 303 are also referred to as bonding wires.

The module body 310B includes a ground line 350B. To be noted, FIG. 13 illustrates wires 351 and 352 serving as a part of the ground line 350B among the plurality of wires 303. The ground line 350B is connected to the negative electrode side of a battery that is a direct current power source.

The image sensor 301B is a CCD image sensor or a CMOS image sensor, and, in the present embodiment, a case where the image sensor 301B is a CMOS image sensor will be described below. In addition, the image sensor 301B is an image sensor of a back side illumination type. In addition, the image sensor 301B is an image sensor of a lamination type. The image sensor 301B includes a pixel chip 321B serving as a first chip, and a logical circuit chip 322B serving as a second chip. To be noted, in FIG. 13, illustration of the pixel chip 321B is omitted for the sake of convenience of description. The pixel chip 321B generates an electric signal by image capturing, and the logical circuit chip 322B processes the electric signal generated by the pixel chip 321B. The pixel chip 321B and the logical circuit chip 322B are bonded to each other. For electrical connection between the pixel chip 321B and the logical circuit chip 322B, Cu—Cu (copper-copper) direct bonding, a silicon through electrode (through silicon via: TSV), or the like is used.

The pixel chip 321B includes a substrate 571B serving as an example of a first substrate, and the pixel portion 200 provided on the substrate 571B and having substantially the same configuration as in the first embodiment. The substrate 571B is a semiconductor substrate such as a silicon substrate in the present embodiment.

The logical circuit chip 322B includes a substrate 572B serving as an example of a second substrate, and an unillustrated logical circuit serving as a processing circuit provided on the substrate 572B. The substrate 572B is a semiconductor substrate such as a silicon substrate in the present embodiment.

The substrates 571B and 572B constitute the base body 550B serving as an example of a first base body. The image sensor 301B includes aground wiring portion 500B provided to extend from the substrate 571B to the 572B. The ground wiring portion 500B is included in the ground line 350B. The ground wiring portion 500B is formed from metal such as copper, aluminum, or tungsten.

The ground wiring portion 500B is used for applying a voltage to each pixel 201 of the pixel portion 200 illustrated in FIG. 3. Specifically, the ground wiring portion 500B is used for applying a ground potential to each pixel 201 among a power source potential and the ground potential.

The ground wiring portion 500B includes a ground pattern 504 serving as an example of a first conductive pattern similarly to the first embodiment. The ground pattern 504 is provided on the substrate 571B. The positional relationship between the ground pattern 504 and the pixel portion 200 is reversed from the first embodiment. That is, the ground pattern 504 is disposed on the side opposite to the light incident side of the pixel portion 200.

The printed wiring board 302B includes a base body 650B serving as an example of a second base body, and a ground wiring portion 600B provided in the base body 650B. The base body 650B is, for example, an insulating substrate formed from an insulating material such as glass epoxy resin or ceramics. In the third embodiment, the frame member 311 is sandwiched between the cover glass 312 and the base body 650B as illustrated in FIGS. 12A and 12B. The frame member 311 is disposed to surround the image sensor 301B. The frame member 311 is formed from resin. The frame member 311 is fixed to the base body 650B with an adhesive or the like. The cover glass 312 is fixed to the upper surface of the frame member 311 with an adhesive or the like.

The ground wiring portion 600B is included in the ground line 350B. The ground wiring portion 600B is formed from metal such as copper, aluminum, or tungsten. The ground wiring portion 600B includes a ground pattern 604 serving as an example of a second conductive pattern similarly to the first embodiment. For example, the ground pattern 604 is disposed in an inner layer of the base body 650B of the printed wiring board 302B.

The ground pattern 504 and the ground pattern 604 are electrically connected to each other by at least one, for example, nine connection conductor portions 391 and at least one, for example, nine connection conductor portions 392 similarly to the first embodiment.

As illustrated in FIG. 13, the connection conductor portions 391 each include a pad 551, a connection line 561, a wire 351, a pad 651, and a via conductor 671 similarly to the first embodiment. In addition, the connection conductor portions 392 each include a pad 552, a connection line 562, a wire 352, a pad 652, and a via conductor 672 similarly to the first embodiment.

In the present embodiment, the pad 551 and the connection line 561 are disposed in the substrate 572B of the image sensor 301B, and the pad 651 and the via conductor 671 are disposed in the base body 650B of the printed wiring board 302B. Similarly, in the present embodiment, the pad 552 and the connection line 562 are disposed in the substrate 572B of the image sensor 301B, and the pad 652 and the via conductor 672 are disposed in the base body 650B of the printed wiring board 302B.

As illustrated in FIG. 12B, part of the ground line 350B forms a loop structure L3 formed from a conductor when the module body 310B is viewed from the side in the X-axis direction. The loop structure L3 includes the ground pattern 504, the ground pattern 604, the connection conductor portions 391, and the connection conductor portions 392. The magnetic fields 150 and 151 illustrated in FIG. 1 cross the loop structure L3. Therefore, an induced current is generated in the loop structure L3. This induced current generates a noise voltage in the pixels 201 of the pixel portion 200 illustrated in FIG. 3.

In the third embodiment, the ground line 350B of the module body 310B includes at least one conductor portion connected in parallel to the ground pattern 504 in addition to the ground pattern 604. The at least one conductor portion is a conductor portion 700B in the third embodiment.

In the third embodiment, the conductor portion 700B is included in the image sensor 301B, and is disposed in the base body 550B. The conductor portion 700B is formed to extend from the substrate 571B to the substrate 572B. The specific configuration of the conductor portion 700B will be described below.

The conductor portion 700B includes a conductive pattern 710B serving as an example of at least one third conductive pattern. The conductive pattern 710B is disposed in the substrate 572B.

The pad 551 and the connection line 561 of each of the connection conductor portions 391 are disposed in the same layer as the conductive pattern 710B in the substrate 572B. In addition, the pad 552 and the connection line 562 of each of the connection conductor portions 392 are disposed in the same layer as the conductive pattern 710B in the substrate 572B. The pad 551 is connected to the conductive pattern 710B via the connection line 561. Similarly, the pad 552 is connected to the conductive pattern 710B via the connection line 562. The pad 551 and the connection line 561 are disposed on the first end side of the conductive pattern 710B in the Y-axis direction, and the pad 552 and the connection line 562 are disposed on the second end side of the conductive pattern 710B in the Y-axis direction.

To be noted, although a case where the pad 551 and the connection line 561 of each of the connection conductor portions 391 are disposed in the substrate 572B has been described, the configuration is not limited to this, and the pad 551 and the connection line 561 may be disposed in the substrate 571B. In this case, the pad 551 and the connection line 561 are disposed in the same layer as the ground pattern 504 in the substrate 571B, and the pad 551 is connected to the ground pattern 504 via the connection line 561.

Similarly, although a case where the pad 552 and the connection line 562 of each of the connection conductor portions 392 are disposed in the substrate 572B has been described, the configuration is not limited to this, and the pad 552 and the connection line 562 may be disposed in the substrate 571B. In this case, the pad 552 and the connection line 562 are disposed in the same layer as the ground pattern 504 in the substrate 571B, and the pad 552 is connected to the ground pattern 504 via the connection line 562.

The region R504 surrounds the ground pattern 504 when the module body 310B is viewed in the Z-axis direction similarly to the first embodiment. In FIG. 13, the region R504 is indicated by a one-dot chain line. In addition, a region R710 surrounds the conductive pattern 710B when the module body 310B is viewed in the Z-axis direction. The region R504 overlaps with part or the entirety of the region R710 when the module body 310B is viewed in the Z-axis direction.

In the present embodiment, the region R504 is a rectangular region of the minimum area among regions surrounding the ground pattern 504 when the module body 310B is viewed in the Z-axis direction. In other words, the region R504 is a region defined by the outer shape of the ground pattern 504 when the module body 310B is viewed in the Z-axis direction. In addition, in the present embodiment, the region R710 is a rectangular region of the minimum area among regions surrounding the conductive pattern 710B when the module body 310B is viewed in the Z-axis direction. In other words, the region R710 is a region defined by the outer shape of the conductive pattern 710B when the module body 310B is viewed in the Z-axis direction.

The conductor portion 700B includes a plurality of connection conductors that electrically interconnect the ground pattern 504 and the conductive pattern 710B. In the present embodiment, the plurality of connection conductors are a plurality of via conductors 711B disposed at a portion where the ground pattern 504 overlaps with the conductive pattern 710B as viewed in the Z-axis direction. The plurality of via conductors 711B are three or more via conductors, and are arranged at intervals in the X-axis direction and the Y-axis direction. The via conductors are each disposed to extend from the substrate 571B to the substrate 572B. According to the configuration described above, a parallel circuit of the ground pattern 504 and the conductor portion 700B is formed.

The parallel circuit of the ground pattern 504 and the conductor portion 700B reduces the resistance ratio of the formula (1). The reduction of the resistance ratio reduces the induced noise voltage $V_{cmos}$. As a result of this, superposition of a noise on a generated image can be reduced. Therefore, the quality of an image generated by the image sensor 301B can be improved.

In addition, voltage drop in the ground pattern 504 can be reduced, and the direct current voltage applied to the pixels 201 being lower than the reference voltage can be suppressed. As a result of this, occurrence of unevenness such as a smear or shading in the image generated by the image sensor 301B can be suppressed. Therefore, the quality of an image generated by the image sensor 301B can be improved.

Since the conductive pattern 710B is disposed to spread planarly in the substrate 572B, the electrical resistance value of the conductor portion 700B can be reduced. In addition, since the ground pattern 504 and the conductive pattern 710B are interconnected by the plurality of via conductors 711B, the electrical resistance value of the parallel circuit of the ground pattern 504 and the conductor portion 700B can be reduced. As a result of this, the voltage drop in the ground pattern 504 can be reduced more effectively. Therefore, the quality of the image generated by the image sensor 301B can be further improved.

Although the ground pattern 504 may be a solid pattern, the ground pattern 504 is preferably formed in a mesh shape to reduce the warpage of the image sensor 301B caused by temperature change. In addition, although the conductive pattern 710B may be a solid pattern, the conductive pattern 710B is preferably formed in a mesh shape to reduce the warpage of the image sensor 301B caused by temperature change.

To be noted, although at least one third conductive pattern disposed in the base body 650B is the one conductive pattern 710B has been described, the configuration is not limited to this. The at least one third conductive pattern may be two or more conductive patterns.

In addition, although a case where the conductive pattern 710B is disposed in the substrate 572B has been described, the conductive pattern 710B may be disposed in the substrate 571B. In the case where a plurality of conductive patterns 710B are provided, one of the plurality of conductive patterns 710B may be disposed in the substrate 571B and the rest may be disposed in the substrate 572B.

In addition, the ground pattern 504 and the conductive pattern 710B do not have to overlap as viewed in the Z-axis direction. That is, the conductor portion 700B may be configured in a similar manner to the conductor portions 700 of the first embodiment.

Example 3

Example 3 corresponding to the third embodiment will be described below. Similarly to Example 1, the noise voltage generated at two ends of the ground pattern 504 in the Y-axis direction was evaluated by using the formula (3) related to the formula (1).

In the description below, the resistance value of the ground pattern 504 is represented by R1, the resistance value of the conductive pattern 710B is represented by R2, and the resistance value of the ground pattern 604 is represented by R3. Further, 108 via conductors were used as the plurality of via conductors 711B. The combined resistance value of the via conductors 711B is represented by R4+R5. The combined resistance value of the nine connection conductor portions 391 is represented by R6, and the combined resistance value of the nine connection conductor portions 392 is represented by R7.

In addition, the resistance values of the pads 551 and 651 in each of the nine connection conductor portions 391 were neglected. In addition, the combined resistance value of the nine connection lines 561 is represented by R6a, the combined resistance value of the nine wires 351 is represented by R6b, and the combined resistance value of the nine via conductors 671 is represented by R6c. That is, R6=R6a+R6b+R6c holds.

In addition, the resistance values of the pads 552 and 652 in each of the nine connection conductor portions 392 were neglected. In addition, the combined resistance value of the nine connection lines 562 is represented by R7a, the combined resistance value of the nine wires 352 is represented by R7b, and the combined resistance value of the nine via conductors 672 is represented by R7c. That is, R7=R7a+R7b+R7c holds.

The resistance values calculated in Example 3 will be described. The width D0, thickness, and length of each of the wires 511 and 512 in the ground pattern 504 illustrated in FIG. 5 were respectively set to 0.7 μm, 0.6 μm, and 20 mm. In addition, aluminum (Al) was set as the material of the ground pattern 504, and the resistivity of the ground pattern 504 was set to $2.82\times10^{-8}$ Ωm. In addition, the number of the wires 512 was set to 6000. As a result of this, the resistance value R1 was 0.224Ω.

In the conductor portion 700B, the width, thickness, and length of the conductive pattern 710B were respectively set to 32 mm, 0.6 μm, and 20 mm. In addition, copper (Cu) was set as the material of the conductive pattern 710B, and the resistivity of the conductive pattern 710B was set to $1.68\times10^{-8}$ Ωm. As a result of this, the resistance value R2 was $2.36\times10^{-11}$ Ω.

The plurality of via conductors 711B were formed to have the same configuration. The diameter and length of each of the via conductors 711B were respectively set to 10 μm and m. In addition, copper (Cu) was set as the material of the via conductors 711B, and the resistivity of the via conductors 711B was set to $1.68\times10^{-8}$ Ωm. As a result of this, the resistance value R4+R5 was $1.56\times10^{-5}$ Ω.

The nine connection conductor portions 391 were formed to have the same shape and size. The width, thickness, and length of each of the connection lines 561 were respectively set to 20 μm, 0.6 μm, and 2 mm. In addition, aluminum (Al) was set as the material of the connection lines 561, and the resistivity of the connection lines 561 was set to $2.82\times10^{-8}$ Ωm. As a result of this, the resistance value R6a was 0.522Ω.

The nine connection conductor portions 392 were formed to have the same shape and size. The width, thickness, and length of each of the connection lines 562 were respectively set to 20 μm, 0.6 μm, and 2 mm. In addition, aluminum (Al) was set as the material of the connection lines 562, and the resistivity of the connection lines 562 was set to $2.82\times10^{-8}$ Ωm. As a result of this, the resistance value R7a was 0.522Ω.

The diameter and length of each of the wires 351 were respectively set to 20 μm and 1.6 mm. In addition, gold (Au) was set as the material of the wires 351, and the resistivity of the wires 351 was set to $2.44\times10^{-8}$ Ωm. As a result of this, the resistance value R6b was 0.014Ω.

The diameter and length of each of the wires 352 were respectively set to 20 μm and 1.6 mm. In addition, gold (Au) was set as the material of the wires 352, and the resistivity of the wires 352 was set to $2.44\times10^{-8}$ Ωm. As a result of this, the resistance value R7b was 0.014Ω.

The diameter and length of each of the via conductors 671 were respectively set to 100 μm and 80 μm. In addition, copper (Cu) was set as the material of the via conductors 671, and the resistivity of the via conductors 671 was set to $1.68\times10^{-8}$ Ωm. As a result of this, the resistance value R6c was $1.90\times10^{-5}$ Ω.

The diameter and length of each of the via conductors 672 were respectively set to 100 μm and 80 μm. In addition, copper (Cu) was set as the material of the via conductors 672, and the resistivity of the via conductors 672 was set to $1.68\times10^{-8}$ Ωm. As a result of this, the resistance value R7c was $1.90\times10^{-5}$ Ω.

The ground pattern 604 was formed in a rectangular shape as viewed in the Z-axis direction. The width, thickness, and length of the ground pattern 604 were respectively set to 36 mm, 15 μm, and 26 mm. In addition, copper (Cu) was set as the material of the ground pattern 604, and the resistivity of the ground pattern 604 was set to $1.68\times10^{-8}$ Ωm. As a result of this, the resistance value R3 was 0.0008Ω.

Therefore, in Example 3, the resistance value A was 0.00081Ω, and the resistance value B was 1.073Ω. Therefore, in Example 3, B>A held. In addition, in Example 3, the resistance ratio A/(A+B) was 0.00075. Here, the resistance ratio A/(A+B) corresponds to the resistance ratio of the formulae (1) and (3).

In Comparative Example 1, the resistance value A was the resistance value R1, which was 0.224Ω. In addition, in Comparative Example 1, the resistance value B was 1.073Ω similarly to Example 3. In Comparative Example 1, the resistance ratio A/(A+B) was 0.173.

In addition, in Example 3, R1=0.224Ω, R2=$2.36\times10^{-11}$ Ω, R4=$1.56\times10^{-5}$ Ω, and R5=$1.56\times10^{-5}$ Ω held. Therefore, in Example 3, R1>R2+R4+R5 held.

Figure 14:
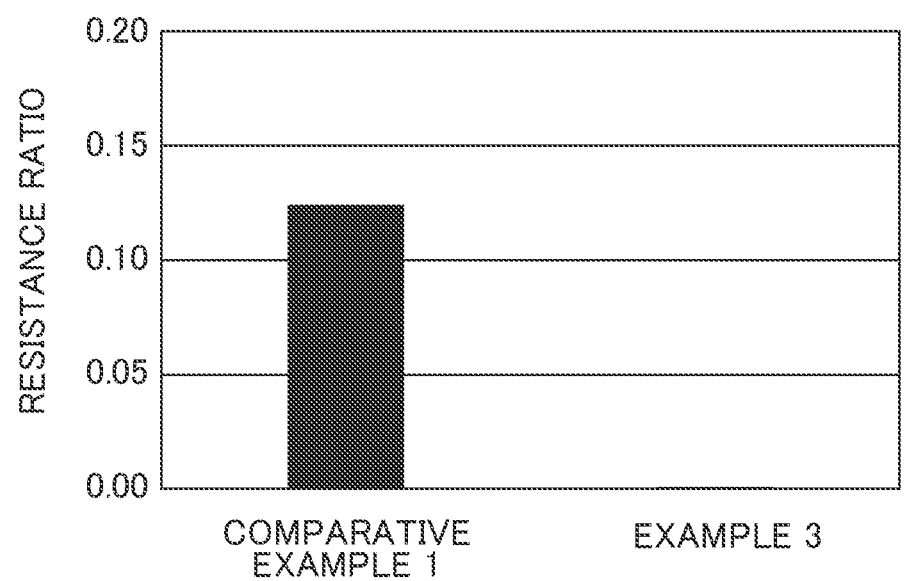
FIG. 14 is a graph of Example 3 and Comparative Example 1.

FIG. 14 is a graph of the resistance ratio A/(A+B) of Example 3 and Comparative Example 1. The resistance ratio A/(A+B) is proportional to the induced noise voltage $V_{noise}$. That is, the resistance ratio A/(A+B) is also a standardized value of the induced noise voltage $V_{noise}$. Since the resistance ratio was 0.173 in Comparative Example 1 and 0.00081 in Example 3, the amount of decrease in the induced noise voltage $V_{noise}$ of Example 3 with respect to Comparative Example 1 was about 99.6%. Therefore, it was confirmed that the induced noise voltage $V_{noise}$ was reduced in Example 3 with respect to Comparative Example 1.

Fourth Embodiment

Figure 15A:
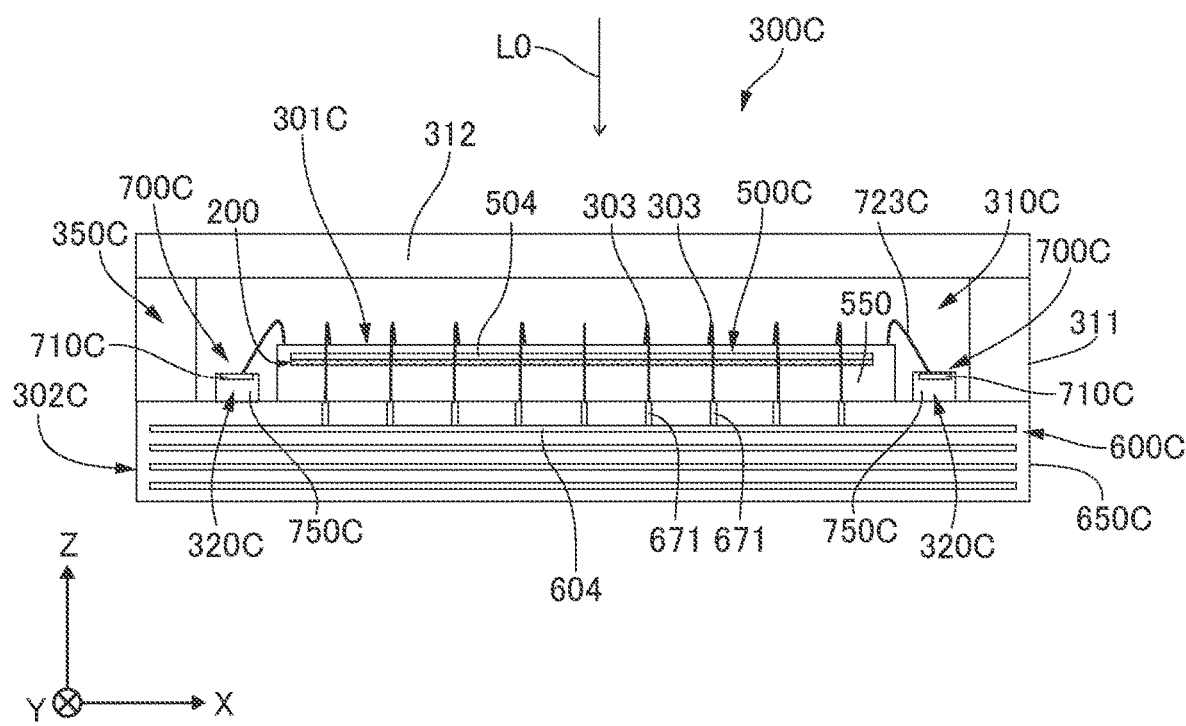
FIG. 15A is a section view of an image pickup module according to a fourth embodiment.
Figure 15B:
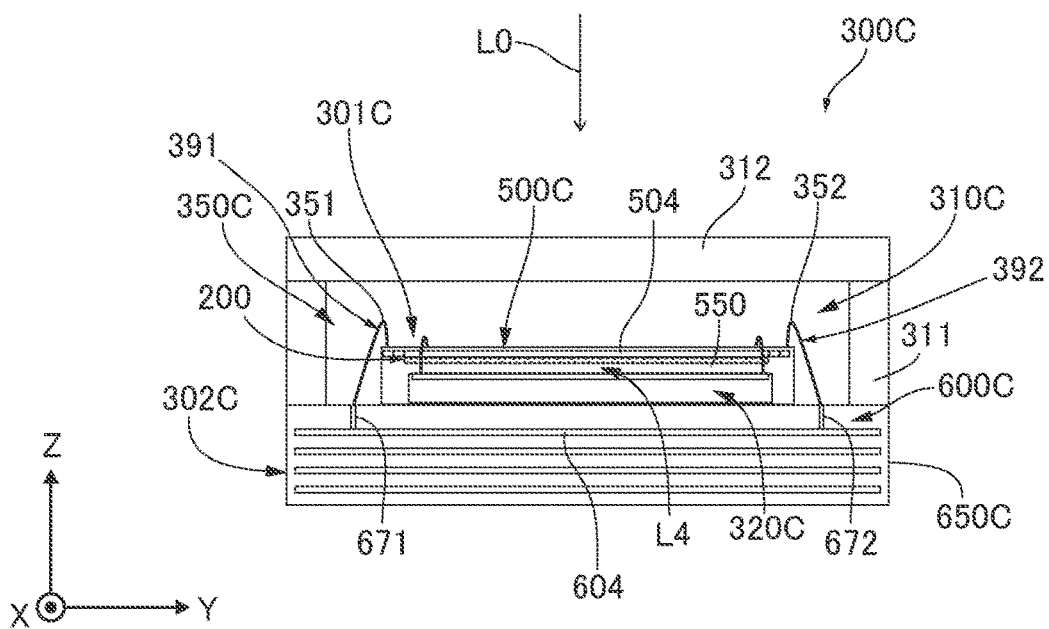
FIG. 15B is a section view of the image pickup module according to the fourth embodiment.
Figure 16:
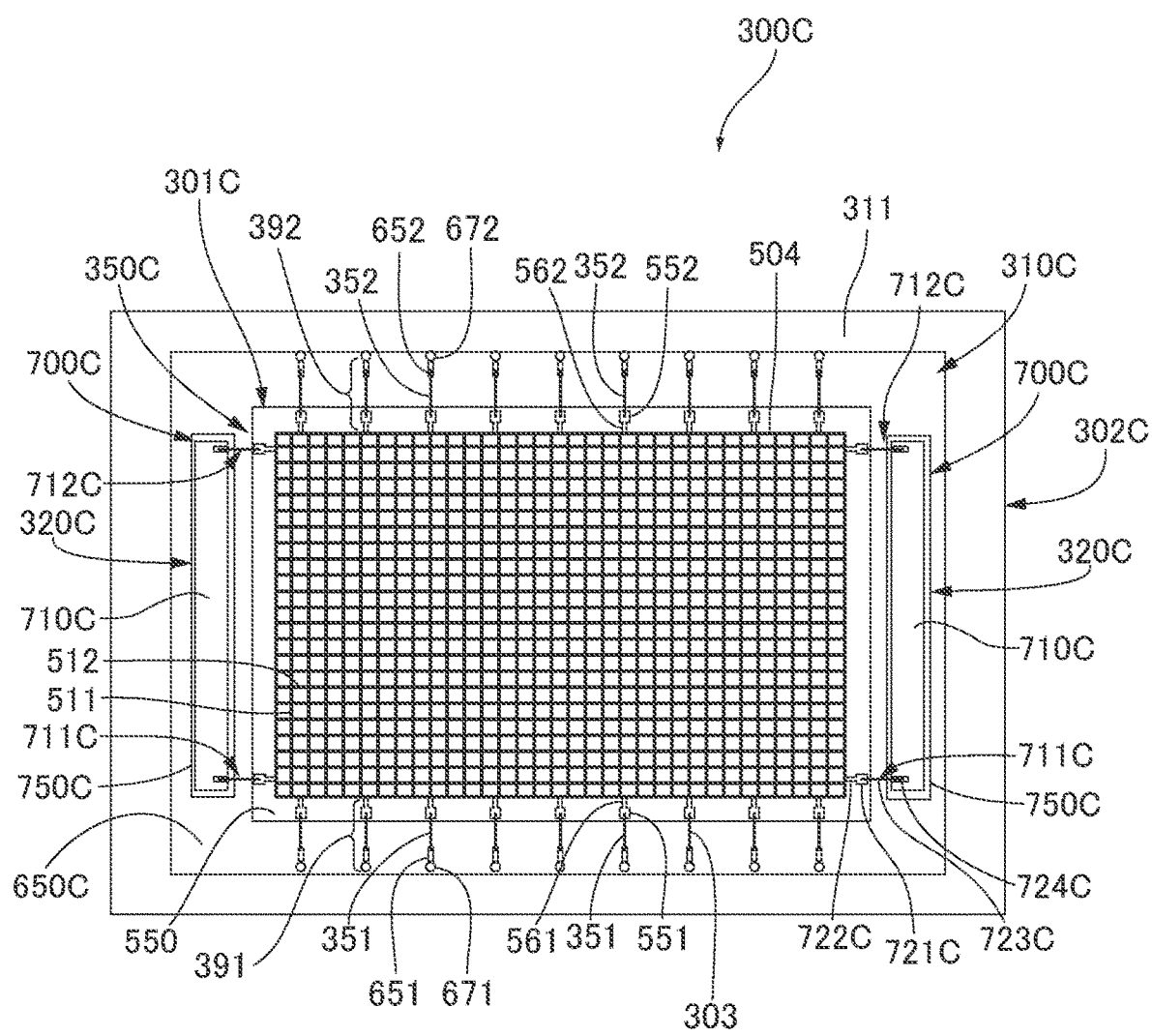
FIG. 16 is a plan view of the image pickup module according to the fourth embodiment.

Next, an image pickup module according to a fourth embodiment will be described. FIGS. 15A and 15B are each a section view of an image pickup module 300C according to the fourth embodiment. FIG. 16 is a plan view of the image pickup module 300C according to the fourth embodiment. In the fourth embodiment, elements substantially the same as in the first embodiment will be denoted by the same reference signs, and detailed description thereof will be omitted. The image pickup apparatus of the fourth embodiment includes the image pickup module 300C instead of the image pickup module 300 in FIG. 1.

FIG. 15A is a schematic section view of the image pickup module 300C taken along the X-Z plane. FIG. 15B is a schematic section view of the image pickup module 300C taken along the Y-Z plane. FIG. 16 is a schematic plan view of the image pickup module 300C as viewed in a direction perpendicular to the X-Y plane.

The image pickup module 300C includes a module body 310C, the frame member 311, and the cover glass 312. To be noted, in FIG. 16, illustration of the cover glass 312 is omitted. The module body 310C includes an image sensor 301C and a printed wiring board 302C on which the image sensor 301C is mounted. In addition, the module body 310C includes a printed wiring board 320C fixed to the printed wiring board 302C.

The printed wiring board 302C includes wiring such as a power supply line, a ground line, and a signal line. In addition, the printed wiring board 302C is a rigid wiring board. In the present embodiment, the image sensor 301C and the printed wiring board 302C are connected to each other by wire bonding. That is, the module body 310C includes the plurality of wires 303 electrically interconnecting the image sensor 301C and the printed wiring board 302C, and a plurality of wires 723C electrically interconnecting the image sensor 301C and the printed wiring board 320C. The wires 303 and 723C are each formed from metal such as gold. These wires 303 and 723C are also referred to as bonding wires.

The module body 310C includes a ground line 350C. To be noted, FIG. 16 illustrates wires 351 and 352 serving as a part of the ground line 350C among the plurality of wires 303. The ground line 350C is connected to the negative electrode side of the battery that is a direct current power source.

The image sensor 301C is a CCD image sensor or a CMOS image sensor, and, in the present embodiment, a case where the image sensor 301C is a CMOS image sensor will be described below. In addition, the image sensor 301C is an image sensor of a front side illumination type. The image sensor 301C includes the base body 550 serving as an example of a first base body similarly to the first embodiment, the pixel portion 200 similarly to the first embodiment, and a ground wiring portion 500C. The pixel portion 200 and the ground wiring portion 500C are provided in the base body 550. The ground wiring portion 500C is included in the ground line 350C. The ground wiring portion 500C is formed from metal such as copper, aluminum, or tungsten.

The ground wiring portion 500C is used for applying a voltage to each pixel 201 of the pixel portion 200 illustrated in FIG. 3. Specifically, the ground wiring portion 500C is used for applying a ground potential to each pixel 201 among a power source potential and the ground potential.

The ground wiring portion 500C includes the ground pattern 504 serving as an example of a first conductive pattern similarly to the first embodiment. The positional relationship between the pixel portion 200 and the ground pattern 504 is similar to that of the first embodiment. The ground pattern 504 includes the plurality of wires 511 and the plurality of wires 512. The mesh shape is formed by crisscross arrangement of the plurality of wires 511 and the plurality of wires 512. The light L0 is incident on the photodiode 211 of each pixel 201 of the pixel portion 200 illustrated in FIG. 3 through the mesh shape of the ground pattern 504. In addition, since the ground pattern 504 has a mesh shape, warpage of the image sensor 301C caused by change in the temperature of the image pickup module 300C can be suppressed.

The printed wiring board 302C includes a base body 650C serving as an example of a second base body, and a ground wiring portion 600C provided in the base body 650C. The base body 650C is, for example, an insulating substrate formed from an insulating material such as glass epoxy resin or ceramics. The frame member 311 is sandwiched between the cover glass 312 and the base body 650C as illustrated in FIGS. 15A and 15B.

The ground wiring portion 600C is included in the ground line 350C. The ground wiring portion 600C is formed from metal such as copper, aluminum, or tungsten. The ground wiring portion 600C includes the ground pattern 604 serving as an example of a second conductive pattern similarly to the first embodiment. For example, the ground pattern 604 is disposed in an inner layer of the base body 650C of the printed wiring board 302C.

The ground pattern 504 and the ground pattern 604 are electrically connected to each other by at least one, for example, nine connection conductor portions 391 and at least one, for example, nine connection conductor portions 392 similarly to the first embodiment.

As illustrated in FIG. 16, the connection conductor portions 391 each include a pad 551, a connection line 561, a wire 351, a pad 651, and a via conductor 671 similarly to the first embodiment. In addition, the connection conductor portions 392 each include a pad 552, a connection line 562, a wire 352, a pad 652, and a via conductor 672 similarly to the first embodiment.

As illustrated in FIG. 15B, part of the ground line 350C forms a loop structure L4 formed from a conductor when the module body 310C is viewed from the side in the X-axis direction. The loop structure L4 includes the ground pattern 504, the ground pattern 604, the connection conductor portions 391, and the connection conductor portions 392. The magnetic fields 150 and 151 illustrated in FIG. 1 cross the loop structure L4. Therefore, an induced current is generated in the loop structure L4. This induced current generates a noise voltage in the pixels 201 of the pixel portion 200 illustrated in FIG. 3.

In the fourth embodiment, the ground line 350C of the module body 310C includes at least one conductor portion connected in parallel to the ground pattern 504 in addition to the ground pattern 604. The at least one conductor portion is two conductor portions 700C in the fourth embodiment.

In the fourth embodiment, the conductor portions 700C are each formed to extend from the image sensor 301C to the printed wiring board 320C. The specific configuration of the conductor portions 700C will be described below.

The conductor portions 700C each include a conductive pattern 710C serving as an example of at least one fifth conductive pattern. Here, the printed wiring board 320C includes a base body 750C serving as an example of a third base body. The conductive pattern 710C is provided in the base body 750C. That is, the conductive pattern 710C is included in the printed wiring board 320C. The base body 750C is an insulating substrate and, for example, an organic substrate such as a glass epoxy substrate. The conductive pattern 710C is formed to extend in the Y-axis direction along a side of the ground pattern 504 extending in the Y-axis direction. The conductive pattern 710C is disposed in the base body 750C so as to be close to the ground pattern 504 in the Z-axis direction. This is employed for making an unillustrated loop structure including the conductor portions 700C and the ground pattern 504 different from the loop structure L4 be as small as possible when the module body 310C is viewed from the side in the X-axis direction. It is preferable that a position in the conductive pattern 710C in the Z-axis direction is the same as a position in the ground pattern 504 in the Z-axis direction.

In addition, the conductor portions 700C each include a plurality of connection conductors that electrically interconnect the ground pattern 504 and the conductive pattern 710C. The plurality of connection conductors are arranged at intervals in the Y-axis direction. In the fourth embodiment, the plurality of connection conductors are two connection conductors 711C and 712C as illustrated in FIG. 16. In the fourth embodiment, the connection conductors 711C and 712C have substantially the same configurations, and the connection conductor 711C will be described in detail below. The connection conductor 711C includes a pad 721C, a connection line 722C, a wire 723C, and a pad 724C.

The pad 721C and the connection line 722C are included in the ground wiring portion 500C of the image sensor 301C. That is, the pad 721C and the connection line 722C are provided in the base body 550. The pad 721C and the ground pattern 504 are interconnected by the connection line 722C.

The pad 724C is included in the printed wiring board 320C. The conductive pattern 710C is formed in an outer layer of the base body 750C. In the printed wiring board 320C, the pad 724C and the conductive pattern 710C are integrally formed. To be noted, the conductive pattern 710C may be formed in an inner layer of the base body 750C. In this case, the pad 724C and the conductive pattern 710C may be interconnected by a via conductor.

The pad 721C of the image sensor 301C and the pad 724C of the printed wiring board 320C are interconnected by the wire 723C. In the configuration described above, a parallel circuit of the ground pattern 504 and the conductor portions 700C is formed.

The parallel circuit of the ground pattern 504 and the conductor portions 700C reduces the resistance ratio of the formula (1). The reduction of the resistance ratio reduces the induced noise voltage $V_{cmos}$. As a result of this, superposition of a noise on a generated image can be reduced. Therefore, the quality of an image generated by the image sensor 301C can be improved.

In addition, voltage drop in the ground pattern 504 can be reduced, and the direct current voltage applied to the pixels 201 being lower than the reference voltage can be suppressed. As a result of this, occurrence of unevenness such as a smear or shading in the image generated by the image sensor 301C can be suppressed. Therefore, the quality of an image generated by the image sensor 301C can be improved.

In addition, since the conductive patterns 710C are disposed in the base body 750C of the printed wiring board 320C, the thickness can be increased as compared with a case where the conductive patterns 710C are provided in the image sensor 301C. In addition, the area of the conductive patterns 710C can be increased as viewed in the Z-axis direction as compared with a case where the conductive patterns 710C are disposed outside of the pixel portion 200 in the image sensor 301C. As a result of this, the electrical resistance value of the conductor portions 700C can be reduced further, and the voltage drop in the ground pattern 504 can be more effectively reduced. Therefore, the quality of the image generated by the image sensor 301C can be further improved.

In addition, the conductive patterns 710C are included in the printed wiring board 320C different from the image sensor 301C and the printed wiring board 302C. Therefore, the routing resource in the image sensor 301C and the printed wiring board 302C can be secured.

To be noted, although a case where at least one fourth conductive pattern included in each of the conductor portions 700C is the one conductive pattern 710C has been described, the configuration is not limited to this. The at least one fourth conductive pattern may be two or more conductive patterns.

In addition, although a case where the module body 310C includes the two conductor portions 700C has been described, the configuration is not limited to this. For example, the module body 310C may include only one conductor portion that is connected in parallel to the ground pattern 504. In addition, the module body 310C may include three or more conductor portions connected in parallel to the ground pattern 504.

In addition, although a case where the image sensor 301C is an image sensor of a front side illumination type has been described, the configuration is not limited to this. For example, the image sensor 301C may be an image sensor of a back side illumination type. Also in this case, the ground pattern 504 is preferably formed in a mesh shape, and this suppresses the warpage of the image sensor 301C caused by change in the temperature of the image pickup module 300C.

In addition, the conductive patterns 710C may be formed by, for example, depositing or applying a metal material such as silver (Ag) on the base body 750C.

Fifth Embodiment

Figure 17A:
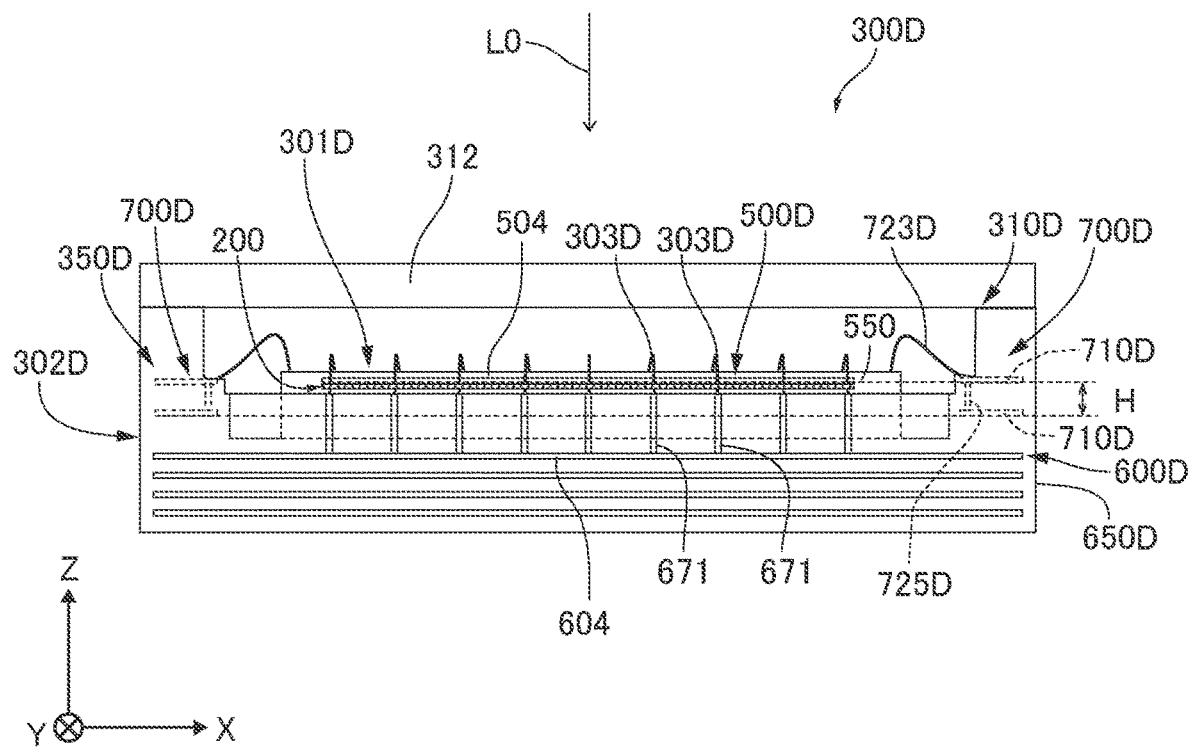
FIG. 17A is a section view of an image pickup module according to a fifth embodiment.
Figure 17B:
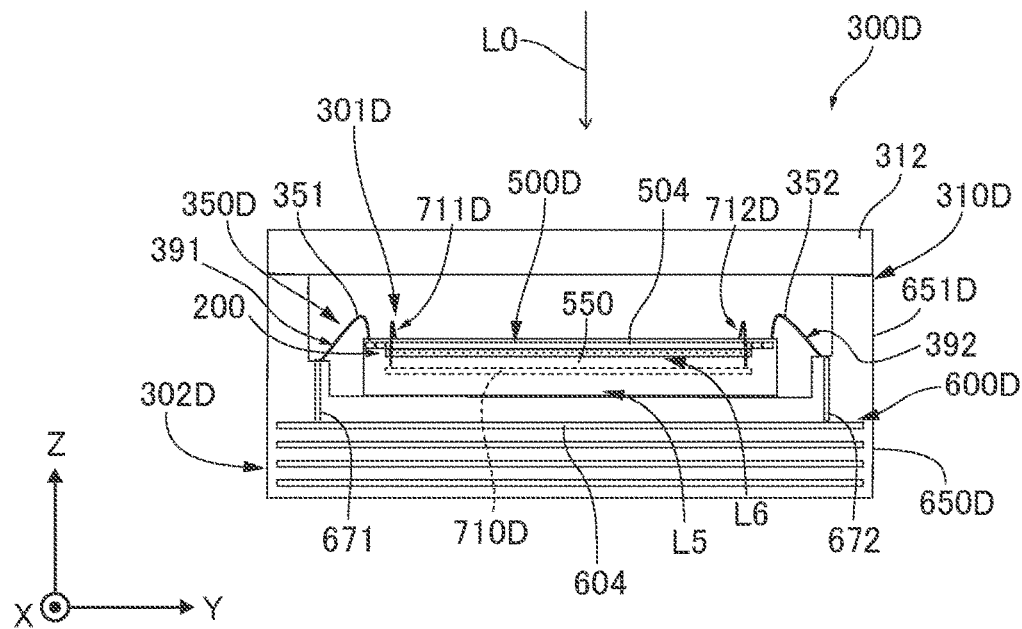
FIG. 17B is a section view of the image pickup module according to the fifth embodiment.
Figure 18:
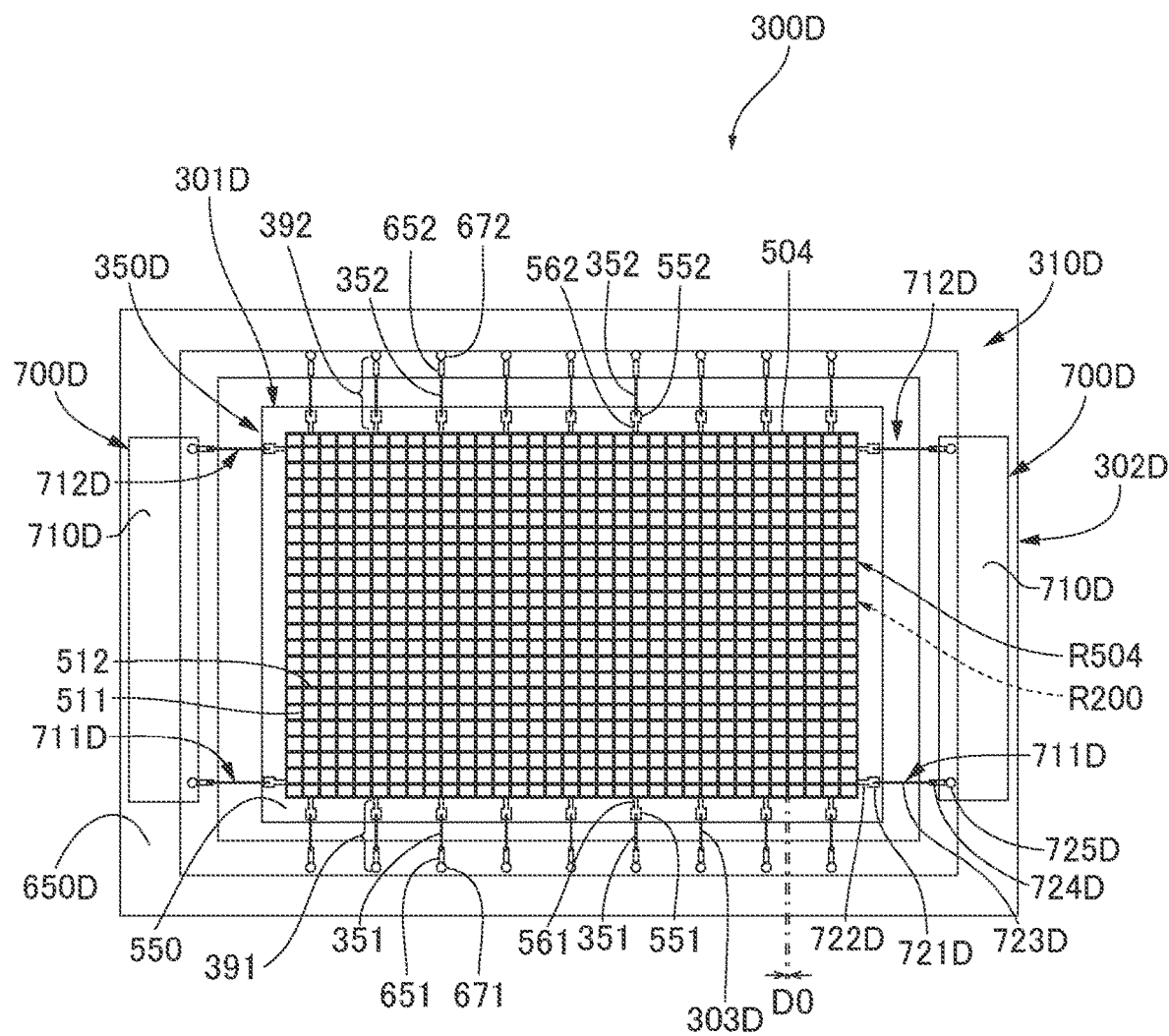
FIG. 18 is a plan view of the image pickup module according to the fifth embodiment.

Next, an image pickup module according to a fifth embodiment will be described. FIGS. 17A and 17B are each a section view of an image pickup module 300D according to the fifth embodiment. FIG. 18 is a plan view of the image pickup module 300D according to the fifth embodiment. In the fifth embodiment, elements substantially the same as in the first and second embodiments will be denoted by the same reference signs, and detailed description thereof will be omitted. The image pickup apparatus of the fifth embodiment includes the image pickup module 300D instead of the image pickup module 300 in FIG. 1.

FIG. 17A is a schematic section view of the image pickup module 300D taken along the X-Z plane. FIG. 17B is a schematic section view of the image pickup module 300D taken along the Y-Z plane. FIG. 18 is a schematic plan view of the image pickup module 300D as viewed in a direction perpendicular to the X-Y plane.

The image pickup module 300D includes a module body 310D and the cover glass 312. To be noted, in FIG. 18, illustration of the cover glass 312 is omitted. The module body 310D includes an image sensor 301D and a printed wiring board 302D on which the image sensor 301D is mounted.

The printed wiring board 302D includes wiring such as a power supply line, a ground line, and a signal line. In addition, the printed wiring board 302D is a rigid wiring board. In the present embodiment, the image sensor 301D and the printed wiring board 302D are connected to each other by wire bonding. That is, the module body 310D includes a plurality of wires 303D electrically interconnecting the image sensor 301D and the printed wiring board 302D as illustrated in FIG. 18. The wires 303D are each formed from metal such as gold. These wires 303D are also referred to as bonding wires.

The module body 310D includes a ground line 350D. To be noted, FIG. 18 illustrates wires 351, 352, and 723D serving as a part of the ground line 350D among the plurality of wires 303D. The ground line 350D is connected to the negative electrode side of a battery that is a direct current power source.

The image sensor 301D is a CCD image sensor or a CMOS image sensor, and, in the present embodiment, a case where the image sensor 301D is a CMOS image sensor will be described below. In addition, the image sensor 301D is an image sensor of a front side illumination type. The image sensor 301D includes the base body 550 serving as an example of a first base body and the pixel portion 200 similarly to the first embodiment, and a ground wiring portion 500D. The pixel portion 200 and the ground wiring portion 500D are provided in the base body 550. The ground wiring portion 500D is included in the ground line 350D. The ground wiring portion 500D is formed from metal such as copper, aluminum, or tungsten.

The ground wiring portion 500D is used for applying a voltage to each pixel 201 of the pixel portion 200 illustrated in FIG. 3. Specifically, the ground wiring portion 500D is used for applying a ground potential to each pixel 201 among a power source potential and the ground potential.

The ground wiring portion 500D includes the ground pattern 504 serving as an example of a first conductive pattern similarly to the first embodiment. Similarly to the first embodiment, the region R504 surrounds the ground pattern 504 when the module body 310D is viewed in the Z-axis direction. In addition, similarly to the first embodiment, the region R200 surrounds the pixel portion 200 when the module body 310D is viewed in the Z-axis direction. The region R504 overlaps with part or the entirety of the region R200 when the module body 310D is viewed in the Z-axis direction. In the present embodiment, the region R504 overlaps with the entirety of the region R200 when the module body 310D is viewed in the Z-axis direction. That is, the region R504 includes the region R200 when the module body 310D is viewed in the Z-axis direction.

Similarly to the first embodiment, the ground pattern 504 is disposed on the light incident side of the pixel portion 200, that is, disposed on the side on which the light L0 is incident on the photodiode 211 of each pixel 201 of the pixel portion 200 illustrated in FIG. 3. In addition, similarly to the first embodiment, the ground pattern 504 is formed in a mesh shape such that the light L0 passes therethrough to the photodiode 211 of each pixel 201. That is, the ground pattern 504 includes the plurality of wires 511 extending in the Y-axis direction and arranged at intervals in the X-axis direction, and the plurality of wires 512 extending in the X-axis direction and arranged at intervals in the Y-axis direction. The mesh shape is formed by crisscross arrangement of the plurality of wires 511 and the plurality of wires 512. The light L0 is incident on the photodiode 211 of each pixel 201 of the pixel portion 200 through the mesh shape of the ground pattern 504.

The printed wiring board 302D includes a base body 650D serving as an example of a second base body, and a ground wiring portion 600D provided in the base body 650D. The base body 650D is, for example, an insulating substrate formed from an insulating material such as glass epoxy resin or ceramics. Although the frame member 311 is sandwiched between the cover glass 312 and the base body 650 in the first embodiment described above as illustrated in FIGS. 4A and 4B, the frame member is not provided in the fifth embodiment. The base body 650D of the fifth embodiment includes a projection portion 651D surrounding the image sensor 301D and corresponding to the frame member. The cover glass 312 is fixed to the upper surface of the projection portion 651D of the base body 650D with an adhesive or the like. As described above, the base body 650D is a cavity substrate, and the surface of the base body 650D on which the image sensor 301D is provided is formed in a recessed shape. The cavity substrate is a counterbore substrate or a laminated substrate.

The ground wiring portion 600D is included in the ground line 350D. The ground wiring portion 600D is formed from metal such as copper, aluminum, or tungsten. The ground wiring portion 600D includes the ground pattern 604 serving as an example of a second conductive pattern similarly to the first embodiment. For example, the ground pattern 604 is disposed in an inner layer of the base body 650D of the printed wiring board 302D.

The ground pattern 504 and the ground pattern 604 are electrically connected to each other by at least one, for example, nine connection conductor portions 391 and at least one, for example, nine connection conductor portions 392 similarly to the first embodiment.

As illustrated in FIG. 18, the connection conductor portions 391 each include a pad 551, a connection line 561, a wire 351, a pad 651, and a via conductor 671 similarly to the first embodiment. In addition, the connection conductor portions 392 each include a pad 552, a connection line 562, a wire 352, a pad 652, and a via conductor 672 similarly to the first embodiment.

As illustrated in FIG. 17B, part of the ground line 350D forms a loop structure L5 formed from a conductor when the module body 310D is viewed from the side in the X-axis direction. The loop structure L5 includes the ground pattern 504, the ground pattern 604, the connection conductor portions 391, and the connection conductor portions 392. The magnetic fields 150 and 151 illustrated in FIG. 1 cross the loop structure L5. Therefore, an induced current is generated in the loop structure L5. This induced current generates a noise voltage in the pixels 201 of the pixel portion 200 illustrated in FIG. 3.

In the fifth embodiment, the ground line 350D of the module body 310D includes at least one conductor portion connected in parallel to the ground pattern 504 in addition to the ground pattern 604. The at least one conductor portion is two conductor portions 700D in the fifth embodiment.

In the fifth embodiment, the conductor portions 700D are each formed to extend from the image sensor 301D to the printed wiring board 302D. The specific configuration of the conductor portions 700D will be described below.

The conductor portions 700D each include a conductive pattern 710D serving as an example of at least one fourth conductive pattern provided in the base body 650D. The conductive pattern 710D is formed to extend in the Y-axis direction along a side of the ground pattern 504 extending in the Y-axis direction.

In addition, the conductor portions 700D each include a plurality of connection conductors that electrically interconnect the ground pattern 504 and the conductive pattern 710D. The plurality of connection conductors are arranged at intervals in the Y-axis direction. In the fifth embodiment, the plurality of connection conductors are two connection conductors 711D and 712D as illustrated in FIG. 18. In the fifth embodiment, the connection conductors 711D and 712D have substantially the same configurations, and the connection conductor 711D will be described in detail below. The connection conductor 711D includes a pad 721D, a connection line 722D, a wire 723D, a pad 724D, and a via conductor 725D.

The pad 721D and the connection line 722D are included in the ground wiring portion 500D of the image sensor 301D. That is, the pad 721D and the connection line 722D are provided in the base body 550. The pad 721D and the ground pattern 504 are interconnected by the connection line 722D.

The pad 724D and the via conductor 725D are included in the ground wiring portion 600D of the printed wiring board 302D. That is, the pad 724D and the via conductor 725D are provided in the base body 650D. In the printed wiring board 302D, the pad 724D and the conductive pattern 710D are interconnected by the via conductor 725D.

The pad 721D of the image sensor 301D and the pad 724D of the printed wiring board 302D are interconnected by the wire 723D. In the configuration described above, a parallel circuit of the ground pattern 504 and the conductor portions 700D is formed.

The parallel circuit of the ground pattern 504 and the conductor portions 700D reduces the resistance ratio of the formula (1). The reduction of the resistance ratio reduces the induced noise voltage $V_{cmos}$. As a result of this, superposition of a noise on a generated image can be reduced. Therefore, the quality of an image generated by the image sensor 301D can be improved.

In addition, voltage drop in the ground pattern 504 can be reduced, and the direct current voltage applied to the pixels 201 being lower than the reference voltage can be suppressed. As a result of this, occurrence of unevenness such as a smear or shading in the image generated by the image sensor 301D can be suppressed. Therefore, the quality of an image generated by the image sensor 301D can be improved.

In addition, since the conductive patterns 710D are disposed in the base body 650D of the printed wiring board 302D, the thickness can be increased as compared with a case where the conductive patterns 710D are provided in the image sensor 301D. As a result of this, the electrical resistance value of the conductor portions 700D can be reduced further, and the voltage drop in the ground pattern 504 can be more effectively reduced. Therefore, the quality of the image generated by the image sensor 301D can be further improved.

To be noted, although a case where at least one fourth conductive pattern disposed in the base body 650D is the one conductive pattern 710D has been described, the configuration is not limited to this. The at least one fourth conductive pattern may be two or more conductive patterns.

In addition, although a case where the module body 310D includes the two conductor portions 700D has been described, the configuration is not limited to this. For example, the module body 310D may include only one conductor portion that is connected in parallel to the ground pattern 504. In addition, the module body 310D may include three or more conductor portions connected in parallel to the ground pattern 504.

In addition, although a case where the image sensor 301D is an image sensor of a front side illumination type has been described, the configuration is not limited to this. For example, the image sensor 301D may be an image sensor of aback side illumination type. Also in this case, the ground pattern 504 is preferably formed in a mesh shape, and this suppresses the warpage of the image sensor 301D caused by change in the temperature of the image pickup module 300D.

Here, as illustrated in FIG. 17A, the distance between the ground pattern 504 and the conductive patterns 710D in the Z-axis direction is denoted by H. If this distance H is larger than 0, a loop structure L6 that is different from the loop structure L5 and includes the conductor portions 700D and the ground pattern 504 when the module body 310D is viewed in the X-axis direction is formed as illustrated in FIG. 17B.

The noise voltage $V_{noise}$ induced in the ground pattern 504 by the two loop structures L5 and L6 is expressed by the formula (6).

$$V_{noise} = \frac{R_1 \cdot (R_2 + R_4 + R_5)}{\left(\begin{array}{c}(R_2 + R_4 + R_5) \cdot (R_3 + R_6 + R_7) + R_1 \cdot \\ (R_2 + R_4 + R_5) + R_1 \cdot (R_3 + R_6 + R_7)\end{array}\right)} \times V_2 + \quad (6)$$

$$\frac{R_1 \cdot ((R_2 + R_4 + R_5) + (R_3 + R_6 + R_7))}{\left(\begin{array}{c}(R_2 + R_4 + R_5) \cdot (R_3 + R_6 + R_7) + R_1 \cdot \\ (R_2 + R_4 + R_5) + R_1 \cdot (R_3 + R_6 + R_7)\end{array}\right)} \times V_1$$

Figure 19:
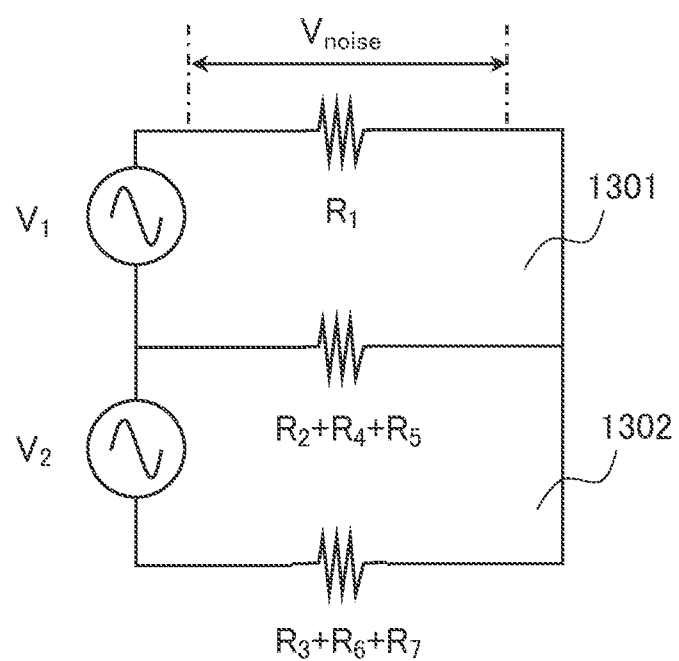
FIG. 19 is an equivalent circuit diagram of a ground line of the image pickup module according to the fifth embodiment.

FIG. 19 is an equivalent circuit diagram of the ground line of the image pickup module 300D according to the fifth embodiment. The resistance value of the ground pattern 504 is represented by R1. In addition, the combined resistance value of the two conductive patterns 710D is represented by R2. In addition, the resistance value of the ground pattern 604 is represented by R3. Further, the resistance values of the connection conductors 711D and 712D between the ground pattern 504 and the conductive patterns 710D are respectively represented by R4 and R5. In addition, the resistance values of the connection conductor portions 391 and 392 between the ground pattern 504 and the ground pattern 604 are respectively represented by R6 and R7. The voltage induced by a loop 1301 of the ground pattern 504 and the conductor portions 700D is represented by $V_1$, and the voltage induced by a loop 1302 of the conductor portions 700D and the ground pattern 604 is represented by $V_2$.

According to the formula (6) described above, the distance H between the ground pattern 504 and the conductive patterns 710D in the Z-axis direction is preferably smaller than ½ of the distance between the ground patterns 504 and 604. That is, in the Z-axis direction, the distance H between the conductive patterns 710D and the ground pattern 504 is preferably smaller than the distance between the conductive patterns 710D and the ground pattern 604. As a result of this, the image noise caused by the magnetic fields 150 and 151 crossing the loop structure L6 can be suppressed. The distance H is preferably 0 in which the loop structure L6 is eliminated. To be noted, if the distance H is 0, the via conductors 725D may be omitted.

Example 4

Example 4 corresponding to the fifth embodiment will be described below. In Example 4, the induced noise voltage $V_{noise}$ was calculated on the basis of the formula (6) while changing the distance H. The voltage $V_1$ induced by the loop formed by the ground pattern 504 and the conductor portions 700D and the voltage $V_2$ induced by the loop formed by the ground pattern 604 and the conductor portions 700D contribute to the induced noise voltage $V_{noise}$ more greatly than the resistance values do. The induced noise voltage is proportional to the loop area.

In the description below, the resistance value of the ground pattern 504 is represented by R1, the combined resistance value of the two conductive patterns 710D is represented by R2, and the resistance value of the ground pattern 604 is represented by R3. Further, the combined resistance value of the two connection conductors 711D is represented by R4, and the combined resistance value of the two connection conductors 712D is represented by R5. The combined resistance value of the nine connection conductor portions 391 is represented by R6, and the combined resistance value of the nine connection conductor portions 392 is represented by R7.

In addition, the resistance values of the pads 551 and 651 in each of the nine connection conductor portions 391 were neglected. In addition, the combined resistance value of the nine connection lines 561 is represented by R6a, the combined resistance value of the nine wires 351 is represented by R6b, and the combined resistance value of the nine via conductors 671 is represented by R6c. That is, R6=R6a+R6b+R6c holds.

In addition, the resistance values of the pads 552 and 652 in each of the nine connection conductor portions 392 were neglected. In addition, the combined resistance value of the nine connection lines 562 is represented by R7a, the combined resistance value of the nine wires 352 is represented by R7b, and the combined resistance value of the nine via conductors 672 is represented by R7c. That is, R7=R7a+R7b+R7c holds.

In addition, in each of the two connection conductors 711D, the resistance values of the pads 721D and 724D were neglected. In addition, the combined resistance value of the two connection lines 722D of the two connection conductors 711D is represented by R4a. The combined resistance value of the two wires 723D of the two connection conductors 711D is represented by R4b. The combined resistance value of the two via conductors 725D of the two connection conductors 711D is represented by R4c. That is, R4=R4a+R4b+R4c holds.

In addition, in each of the two connection conductors 712D, the resistance values of the pads 721D and 724D were neglected. In addition, the combined resistance value of the two connection lines 722D of the two connection conductors 712D is represented by R5a. The combined resistance value of the two wires 723D of the two connection conductors 712D is represented by R5b. The combined resistance value of the two via conductors 725D of the two connection conductors 712D is represented by R5c. That is, R5=R5a+R5b+R5c holds.

The resistance values R1 to R7 that were obtained were applied to R1 to R7 of the formula (6), and thus the induced noise voltage $V_{noise}$ was obtained.

The resistance values R1 to R7 calculated in Example 4 will be described. The width D0, thickness, and length of each of the wires 511 and 512 in the ground pattern 504 were respectively set to 0.7 μm, 0.6 μm, and 20 mm. In addition, aluminum (Al) was set as the material of the ground pattern 504, and the resistivity of the ground pattern 504 was set to $2.82 \times 10^{-8}$ Ωm. In addition, the number of the wires 512 was set to 6000. As a result of this, the resistance value R1 was 0.224Ω.

The two conductor portions 700D were formed in symmetrical shapes in the left-right direction as illustrated in FIG. 18. In each of the conductor portions 700D, the width, thickness, and length of each of the conductive patterns 710D were respectively set to 3 mm, 15 μm, and 20 mm. In addition, copper (Cu) was set as the material of the conductive patterns 710D, and the resistivity of the conductive patterns 710D was set to $1.68 \times 10^{-8}$ Ωm. As a result of this, the resistance value R2 was 0.0019Ω.

The two connection conductors 711D and the two connection conductors 712D were formed to have the same configuration. The width, thickness, and length of each of the connection lines 722D were respectively set to 500 μm, 0.6 μm, and 2 mm. In addition, aluminum (Al) was set as the material of the connection lines 722D, and the resistivity of the connection lines 722D was set to $2.82 \times 10^{-8}$ Ωm. As a result of this, the resistance value R4a was 0.0094Ω, and the resistance value R5a was 0.0094Ω.

The diameter and length of each of the wires 723D were respectively set to 20 μm and 1.0 mm. In addition, gold (Au) was set as the material of the wires 723D of the connection conductors 711D, and the resistivity of the wires 723D was set to $2.44 \times 10^{-8}$ Ωm. As a result of this, the resistance value R4b was 0.039Ω, and the resistance value R5b was 0.039Ω.

The diameter and length of each of the via conductor 725D were respectively set to 100 μm and the distance H. The distance H was changed in the range of 0 to 0.7 mm. In addition, copper (Cu) was set as the material of the via conductors 725D, and the resistivity of the via conductors 725D was set to $1.68 \times 10^{-8}$ Ωm. As a result of this, the resistance values R4c and R5c changed in accordance with the distance H.

The nine connection conductor portions 391 were formed to have the same shape and size. The width, thickness, and length of each of the connection lines 561 were respectively set to 20 μm, 0.6 μm, and 2 mm. In addition, aluminum (Al) was set as the material of the connection lines 561, and the resistivity of the connection lines 561 was set to $2.82 \times 10^{-8}$ Ωm. As a result of this, the resistance value R6a was 0.522Ω.

The nine connection conductor portions 392 were formed to have the same shape and size. The width, thickness, and length of each of the connection lines 562 were respectively set to 20 μm, 0.6 μm, and 2 mm. In addition, aluminum (Al) was set as the material of the connection lines 562, and the resistivity of the connection lines 562 was set to $2.82 \times 10^{-8}$ Ωm. As a result of this, the resistance value R7a was 0.522Ω.

The diameter and length of each of the wires 351 were respectively set to 20 μm and 1.6 mm. In addition, gold (Au) was set as the material of the wires 351, and the resistivity of the wires 351 was set to $2.44 \times 10^{-8}$ Ωm. As a result of this, the resistance value R6b was 0.014Ω.

The diameter and length of each of the wires 352 were respectively set to 20 μm and 1.6 mm. In addition, gold (Au) was set as the material of the wires 352, and the resistivity of the wires 352 was set to $2.44 \times 10^{-8}$ Ωm. As a result of this, the resistance value R7b was 0.014Ω.

The diameter and length of each of the via conductors 671 were respectively set to 100 μm, and 0.4 mm. In addition, copper (Cu) was set as the material of the via conductors

671, and the resistivity of the via conductors 671 was set to $1.68\times10^{-8}$ Ωm. As a result of this, the resistance value R6$c$ was $9.50\times10^{-5}$Ω.

The diameter and length of each of the via conductors 672 were respectively set to 100 μm and 0.4 mm. In addition, copper (Cu) was set as the material of the via conductors 672, and the resistivity of the via conductors 672 was set to $1.68\times10^{-8}$ Ωm. As a result of this, the resistance value R7$c$ was $9.50\times10^{-5}$Ω.

The ground pattern 604 was formed in a rectangular shape as viewed in the Z-axis direction. The width, thickness, and length of the ground pattern 604 were respectively set to 36 mm, 15 μm, and 26 mm. In addition, copper (Cu) was set as the material of the ground pattern 604, and the resistivity of the ground pattern 604 was set to $1.68\times10^{-8}$ Ωm. As a result of this, the resistance value R3 was 0.0008Ω.

Figure 20:
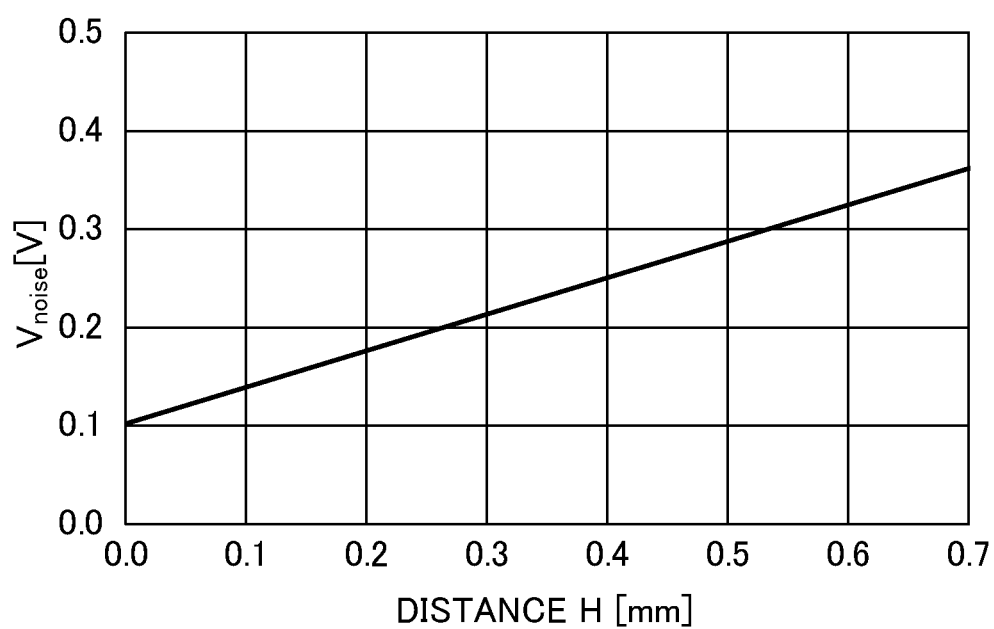
FIG. 20 is a graph showing calculation results of an induced noise voltage according to Example 4.

FIG. 20 is a graph illustrating calculation results of the induced noise voltage $V_{noise}$ of Example 4. The horizontal axis represents the distance H [mm], and the vertical axis represents the induced noise voltage $V_{noise}$ [V]. It can be seen that the induced noise voltage $V_{noise}$ increases proportionally to the increase in the distance H. Therefore, the distance H is preferably shorter because the area of the loop structure L6 becomes smaller and the induced noise voltage $V_{noise}$ becomes smaller. In addition, the distance H is more preferably 0, that is, a position in the Z-axis direction in the conductive pattern 710D more preferably coincides with a position in the Z-axis direction in the ground pattern 504 because the loop structure L6 is eliminated and the induced noise voltage $V_{noise}$ becomes further smaller.

To be noted, the present invention is not limited to the embodiments described above, and can be modified in many ways within the technical concept of the present invention. In addition, the effects described in the embodiments are merely enumeration of most preferable effects that can be obtained from the present invention, and the effects of the present invention are not limited to those described in the embodiments.

Although a case where an image pickup module of the present invention is applied to an image pickup apparatus such as a digital camera has been described in the first to fifth embodiments described above, the configuration is not limited to this. The image pickup module of the present invention is applicable to electronic devices capable of incorporating an image pickup module, for example, mobile communication devices such as smartphones, tablet computers, and gaming devices, and wearable devices.

In addition, although a case where the present invention is applied to a loop structure of a ground line has been described in the first to fifth embodiments, the configuration is not limited to this. The present invention is applicable to a power supply line connected to a pixel.

In addition, although a case where the conductive patterns 710 are each formed in a linear shape along one side of the ground pattern 504 has been described in the first embodiment described above, the configuration is not limited to this. For example, the conductive patterns 710 may be each formed in a U shape or a ring shape that surrounds the ground pattern 504 as viewed in the Z-axis direction. In addition, although a case where the conductive patterns 710A1 and 710A2 are each formed in a linear shape along one side of the ground pattern 504 has been described in the second embodiment described above, the configuration is not limited to this. For example, the conductive patterns 710A1 and/or 710A2 may be formed in a U shape or a ring shape that surrounds the ground pattern 504 as viewed in the Z-axis direction. In addition, although a case where the conductive patterns 710C are each formed in a linear shape along one side of the ground pattern 504 has been described in the fourth embodiment described above, the configuration is not limited to this. For example, the conductive patterns 710C may be each formed in a U shape or a ring shape that surrounds the ground pattern 504 as viewed in the Z-axis direction. In addition, although a case where the conductive patterns 710D are each formed in a linear shape along one side of the ground pattern 504 has been described in the fifth embodiment described above, the configuration is not limited to this. For example, the conductive patterns 710D may be each formed in a U shape or a ring shape that surrounds the ground pattern 504 as viewed in the Z-axis direction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-173533, filed Oct. 14, 2020, which is hereby incorporated by reference herein in its entirety.

What is claimed is:

1. An image pickup module comprising:
   a first base body;
   a pixel portion provided in the first base body and comprising a plurality of pixels arranged in a first direction and a second direction perpendicular to the first direction;
   a first conductive pattern provided in the first base body and used for applying a voltage to each pixel of the pixel portion;
   a second base body on which the first base body is provided;
   a second conductive pattern provided in the second base body and electrically connected to the first conductive pattern via a first connection conductor portion and a second connection conductor portion, wherein a loop structure of conductor including the first conductive pattern, the second conductive pattern, the first connection conductor portion, and the second connection conductor portion is formed as viewed in the first direction; and
   a conductor portion connected in parallel to the first conductive pattern.

2. The image pickup module according to claim 1, wherein the conductor portion is provided in the first base body.

3. The image pickup module according to claim 2, wherein the conductor portion comprises a third conductive pattern extending in the second direction and a plurality of connection conductors that electrically interconnect the first conductive pattern and the third conductive pattern.

4. The image pickup module according to claim 3, wherein a position in a third direction perpendicular to the first direction and the second direction in the third conductive pattern is the same as a position in the third direction in the first conductive pattern.

5. The image pickup module according to claim 3,
   wherein the first base body comprises a first substrate, and a second substrate bonded to the first substrate,
   wherein the pixel portion and the first conductive pattern are provided in the first substrate, and
   wherein the third conductive pattern is provided in the second substrate.

6. The image pickup module according to claim 5, wherein a region surrounding the third conductive pattern overlaps with a region surrounding the first conductive pattern as viewed in a third direction perpendicular to the first direction and the second direction.

7. The image pickup module according to claim 1, wherein the conductor portion comprises a fourth conductive pattern provided in the second base body.

8. The image pickup module according to claim 7, wherein a position in the fourth conductive pattern in a third direction perpendicular to the first direction and the second direction is the same as a position in the first conductive pattern in the third direction.

9. The image pickup module according to claim 1, further comprising:
a third base body provided in the second base body,
wherein the conductor portion comprises a fifth conductive pattern provided in the third base body.

10. The image pickup module according to claim 1, wherein a region surrounding the first conductive pattern overlaps with a region surrounding the pixel portion as viewed in a third direction perpendicular to the first direction and the second direction.

11. The image pickup module according to claim 10, wherein the first conductive pattern is formed in a mesh shape.

12. The image pickup module according to claim 11, wherein the first conductive pattern is disposed on a light incident side with respect to a light receiving portion of each pixel.

13. The image pickup module according to claim 1, wherein the loop structure is included in a ground line used for applying a voltage to each pixel of the pixel portion.

14. An image pickup apparatus comprising:
a casing; and
the image pickup module according to claim 1 disposed inside the casing.

15. The image pickup apparatus according to claim 14, further comprising an inductor disposed inside the casing.

16. An electronic device comprising:
a casing; and
the image pickup module according to claim 1 disposed inside the casing.

* * * * *